(12) United States Patent
Roos et al.

(10) Patent No.: US 10,053,264 B2
(45) Date of Patent: Aug. 21, 2018

(54) BAG STACKER

(71) Applicant: TNA Australia Pty Limited, Lidcombe (AU)

(72) Inventors: Lawrence Roos, Lidcombe (AU);
Brian Pearson, Lidcombe (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 0 days.

(21) Appl. No.: 15/093,147

(22) Filed: Apr. 7, 2016

(65) Prior Publication Data

US 2016/0318720 A1   Nov. 3, 2016

(30) Foreign Application Priority Data

Apr. 28, 2015   (AU) ................. 2015901501

(51) Int. Cl.
  *B65B 35/32*   (2006.01)
  *B65B 35/50*   (2006.01)
  *B65B 9/20*   (2012.01)
  *B65D 33/00*   (2006.01)
  *B65G 57/11*   (2006.01)

(52) U.S. Cl.
  CPC ............ *B65D 33/001* (2013.01); *B65G 57/11* (2013.01); *B65G 2201/0238* (2013.01)

(58) Field of Classification Search
  CPC ..................... B65H 2701/1932; B65H 31/32; B65H 31/10; B65G 57/06; B65G 57/035; B65B 5/024; B65B 5/061; Y10S 414/115
  USPC ...... 198/369.6, 407, 435, 456, 463.3, 468.6, 198/468.8, 560, 564, 737, 750.14, 838; 271/190, 191, 73; 414/331.02, 331.04, 414/788, 788.4, 790, 790.1, 790.3, 790.4, 414/790.6, 790.8, 790.9, 791, 792.7, 414/792.8, 793.1, 793.4, 793.5, 793.6, 414/793.7, 793.8, 793.9, 794, 794.1, 414/794.2, 794.3, 794.5, 794.6, 798.5,
(Continued)

(56) References Cited

U.S. PATENT DOCUMENTS 2,901,952 A  *  9/1959  Taylor ................. B65H 31/28
                                                      271/189
3,414,138 A  *  12/1968  Junemann ............. D05B 33/02
                                                      414/788.9
(Continued)

FOREIGN PATENT DOCUMENTS

DE        37 36 868 A1     5/1989
DE        3736868      *   5/1989
(Continued)

OTHER PUBLICATIONS

Search Report from corresponding British Patent Application GB1605476.9, dated Nov. 17, 2016 (six pages).
(Continued)

*Primary Examiner* — Gregory W Adams
(74) *Attorney, Agent, or Firm* — Kilpatrick Townsend & Stockton LLP

(57) ABSTRACT

An assembly (10) to dispatch bags (14). The assembly (10) includes a conveyor (12) that provides rows of bags (14), with the rows of bags (14) supported on a first delivery assembly (18) that moves each row downward to form stacks (47) of bags (14) on a second delivery assembly (34). Stacks (14) of the bags (14) are then moved downward to be moved into containers or boxes.

17 Claims, 24 Drawing Sheets

(58) Field of Classification Search
USPC ....... 414/799; 53/447, 531, 535, 540; 83/86, 83/94
See application file for complete search history.

(56) References Cited

U.S. PATENT DOCUMENTS

| | | | | |
|---|---|---|---|---|
| 3,531,905 | A * | 10/1970 | Omori | B65B 5/024 53/150 |
| 3,729,895 | A * | 5/1973 | Kramer | B65B 57/20 198/536 |
| 4,460,169 | A * | 7/1984 | Bartesaghi | B65H 29/40 271/192 |
| 4,465,177 | A * | 8/1984 | Dorner | B65G 47/57 198/475.1 |
| 4,934,687 | A * | 6/1990 | Hayden | B65H 9/04 198/461.3 |
| 5,022,218 | A * | 6/1991 | Prakken | B65B 5/061 53/245 |
| 5,218,813 | A | 6/1993 | Seidel | |
| 5,383,760 | A * | 1/1995 | Cawley | B65G 47/086 198/415 |
| 6,145,281 | A * | 11/2000 | Hansen | B65B 5/024 414/789.6 |
| 6,641,358 | B2 * | 11/2003 | Schmidt, V | B65H 31/3009 198/431 |
| 6,925,784 | B2 * | 8/2005 | Escobar | B65B 5/08 414/793.7 |
| 7,699,578 | B2 * | 4/2010 | Nielsen | B65G 57/035 209/659 |
| 8,191,702 | B2 * | 6/2012 | Itoh | B65G 37/005 198/468.8 |
| 8,240,652 | B2 * | 8/2012 | De Matteis | B65H 31/32 270/39.02 |
| 8,356,967 | B2 * | 1/2013 | Gammerler | B65G 57/11 271/218 |
| 2006/0070353 | A1 | 4/2006 | Van Dam | |
| 2011/0277423 | A1 * | 11/2011 | Magri | B65G 57/035 53/443 |
| 2012/0132091 | A1 * | 5/2012 | Roth | B65B 63/02 100/215 |
| 2016/0318720 | A1 | 11/2016 | Roos et al. | |

FOREIGN PATENT DOCUMENTS

| | | |
|---|---|---|
| DE | 3736868 A1 | 5/1989 |
| DE | 10 2011 102 245 A1 | 11/2012 |
| EP | 2 397 42 A1 | 12/2011 |
| EP | 2 397 428 A1 | 12/2011 |
| GB | 2 245 879 A | 1/1992 |
| WO | 2014/195135 A1 | 12/2014 |
| WO | 2015/036147 A1 | 3/2015 |

OTHER PUBLICATIONS

Search Report dated Feb. 3, 2017 from corresponding Spanish Patent Application No. 201630536 (four pages).

* cited by examiner

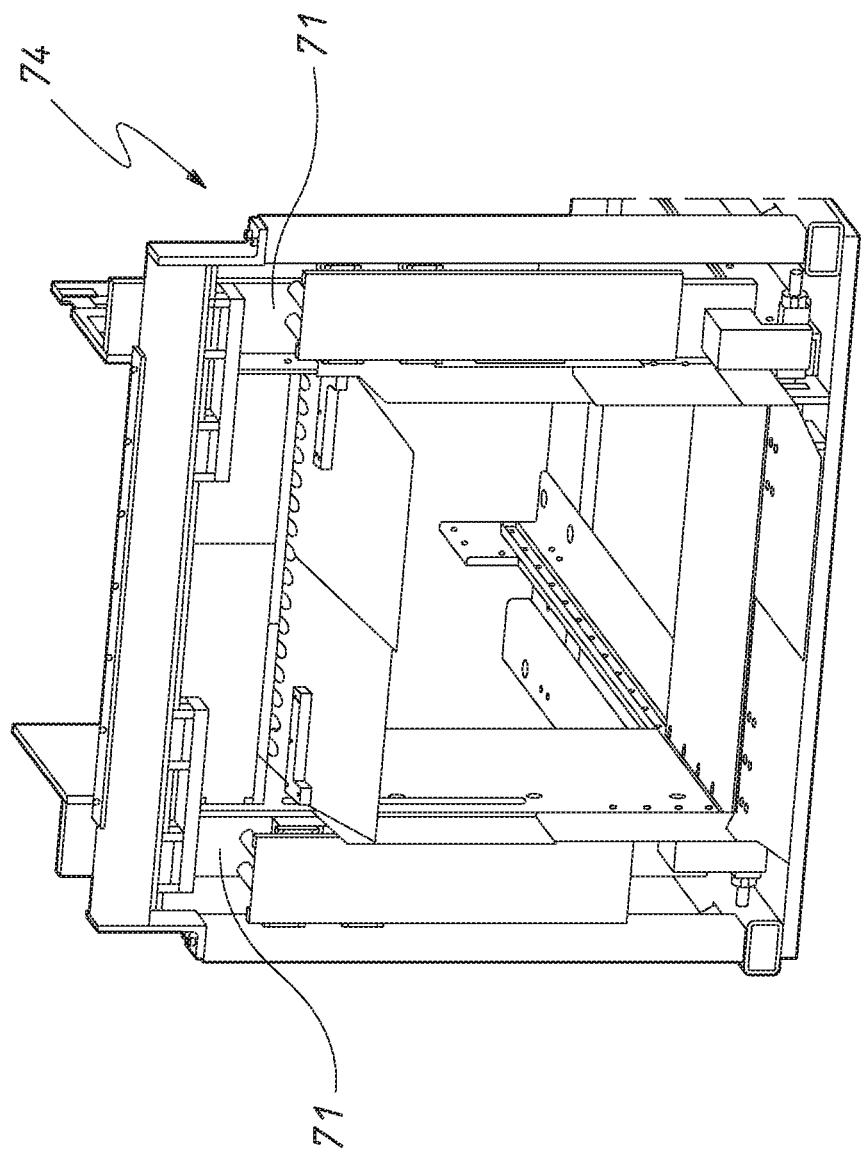

BAG STACKER

CROSS-REFERENCE TO RELATED APPLICATIONS

This application claims the benefit of priority of Australian Application No. 2015901501, filed Apr. 28, 2015, the disclosure of which is herein incorporated by reference.

FIELD

The present invention relates to a stacker that receives and stacks articles such as bags, and more particularly but not exclusively to the stacker that inserts the stacks in a container such as a box.

BACKGROUND

Articles that are stacked, and subsequently inserted in a container such as a box, are frequently stacked in the box manually.

In the industry of manufacturing snack foods, bags are produced by packaging machines, with the individual bags then delivered to a conveyor. The conveyor delivers the bags to a station at which one or more workers are located. The workers gather the bags, arrange them in groups or stacks, and then insert them in a box.

The above discussed method of stacking bags and placing them in a box has the disadvantage that it is time consuming, manual and expensive.

OBJECT OF THE INVENTION

It is the object of the present invention to overcome or substantially ameliorate at least one of the above disadvantages.

SUMMARY OF INVENTION

A stacking assembly to stack articles, the stacking assembly including:

a first delivery assembly to receive a plurality of the articles at a first receiving position and sequentially move the articles downward along a passage to a first delivery position; and a second delivery assembly to receive the articles from the first delivery assembly, at a second receiving position that is adjacent the first delivery position, so that stacks of the articles are sequentially formed in the passage and supported by the second delivery assembly, with the second delivery assembly moving each stack downward, as each stack is being formed; and a control device coordinating operation of the first and the second delivery assemblies in a manner so that the stacks are formed.

Preferably, the second delivery assembly moves each formed stack downward along the passage to a second delivery position.

Preferably, the second delivery assembly moves each stack horizontally to a second delivery position.

Preferably, the first delivery assembly includes at least one first platform to which the articles are delivered at the first delivery position, the first platform being moved down the passage to the first delivery position, and the second delivery assembly includes at least one second platform, the second platform being movable down the passage from the second receiving position to accommodate transfer of the articles from the first platform to be supported on the second platform to provide for stacking of the article being supported by the second platform.

Preferably, the first delivery assembly includes at least one further platform, and the first delivery assembly includes a drive, the drive being operable to move the first platform at a different speed to the further platform.

Preferably, each first platform and each second platform includes a plurality of fingers, with adjacent fingers of each platform being separated by a slot, with the fingers of both platforms extending generally transverse relative to said passage when located therein.

Preferably, the fingers of each platform are generally parallel.

Preferably, the stacking assembly further includes at least one backing member extending adjacent to said passage to aid in retaining the articles on the platforms.

Preferably, the stacking assembly further includes two backing members, the backing members being spaced so as to be on opposite sides of the passage, the backing members cooperating to retain the articles on the platform.

Preferably, each backing member includes a plurality of upwardly extending slots through which the fingers of the first platform and/or the fingers of the second platform pass.

Preferably, both platforms are generally horizontally oriented when passing along said passage, and the platforms when moving along said passage along a generally linear path.

Preferably, the stacking assembly further includes a stack transfer member, the stack transfer member being located adjacent the second platform delivery position, and movable to transfer a form stacks from the passage.

Preferably, the assembly includes at least one door closing a portion of said passage, the door being movable to an open position to provide for transfer of the stacks from within the passage.

Preferably, said door pivots about a generally horizontal axis, and includes a portion that projects into the passage when providing for the delivery of the stacks, the portion being positionable to engage the stacks to ensure that the stacks have a desired height.

Preferably, the stacking assembly further includes a conveyor to deliver the articles to the first platform receiving position, the conveyor being angularly movable to provide for the delivery of bags to each first platform so the bags can be arranged in a generally horizontal row, and said control device coordinate operation of the conveyor with the delivery assemblies.

Preferably, the delivery assemblies are located on opposite side of the passage.

There is also disclosed herein a method of stacking articles, the method including:

delivering a plurality of the articles to a first receiving position at which the articles are supported by a first support, and arranging the articles in a horizontal first row on the first support;

lowering the row to a first delivery position at which row is delivered to a second support at a second receiving position;

lowering the second support from the second receiving position, delivering at least one further row of the articles to the first support at the first receiving position so to as to be supported by the first support;

lowering each further row to the first delivery position; and transferring each further row so as to be supported on the first row so as to form a stack.

Preferably, each stack is transferred in a predetermined direction to the second delivery position.

Preferably, the predetermined direction is downward.

Preferably, the predetermined direction is generally horizontal.

Preferably, the articles are bags.

BRIEF DESCRIPTION OF DRAWINGS

Preferred forms of the present invention will now be described by way of example with reference to the accompanying drawings wherein:

FIG. 24 is a still further isometric view of the lower portion of FIG. 21.

DESCRIPTION OF EMBODIMENTS

Figure 1:
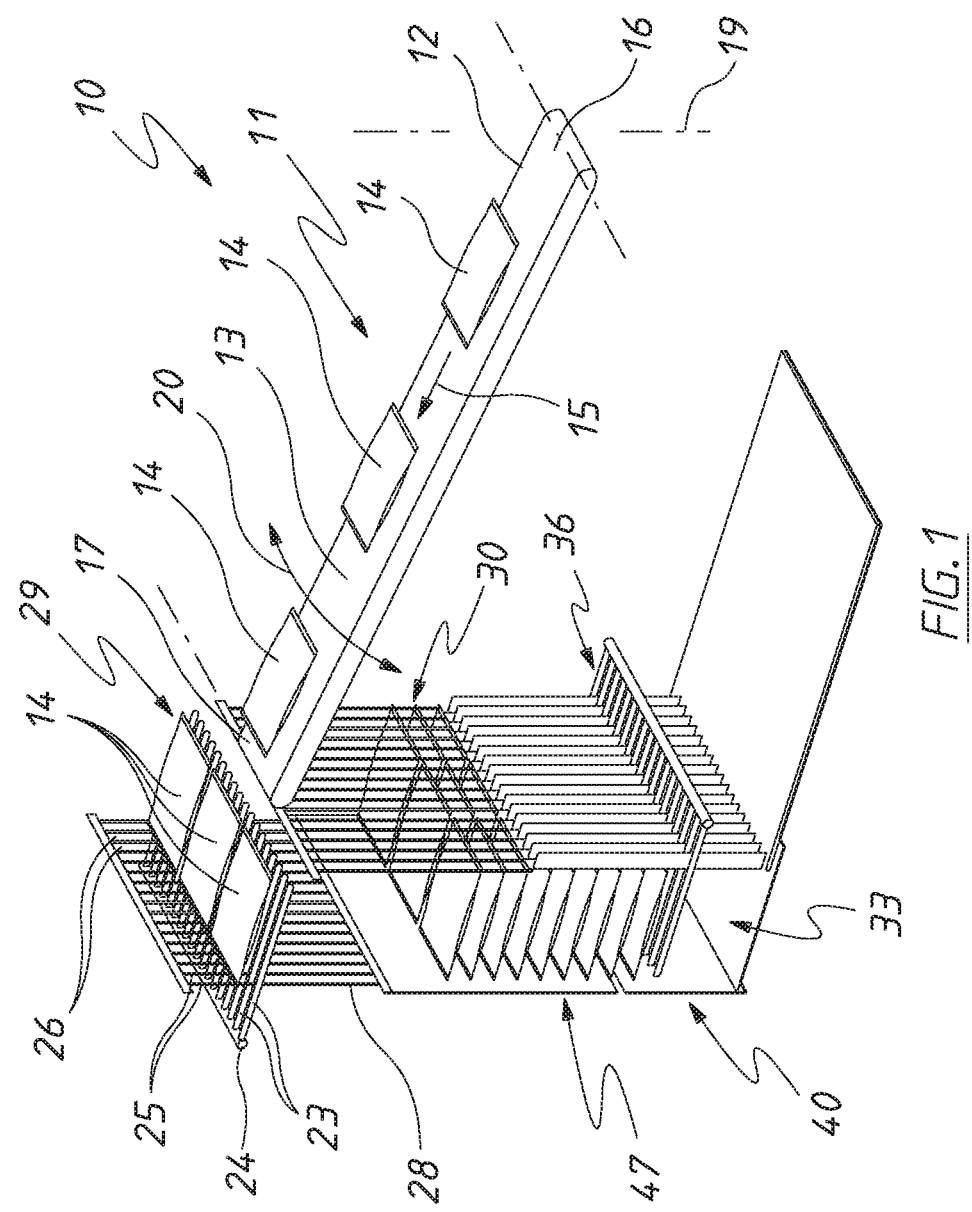
FIG. 1 is a simplified schematic isometric view of a bag stacking assembly.
Figure 2:
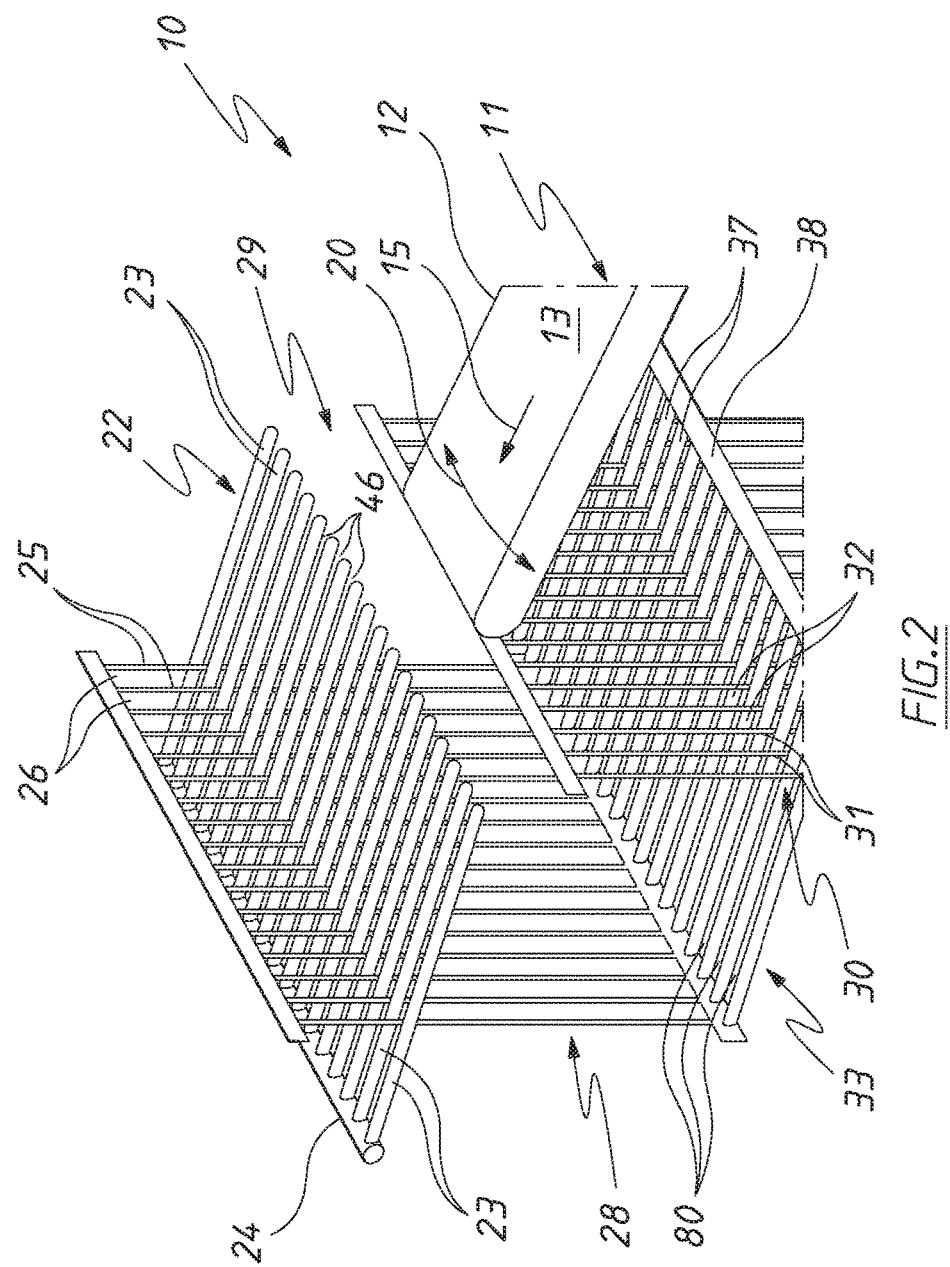
FIG. 2 is a schematic isometric view of portion of the assembly of FIG. 1.
Figure 3:
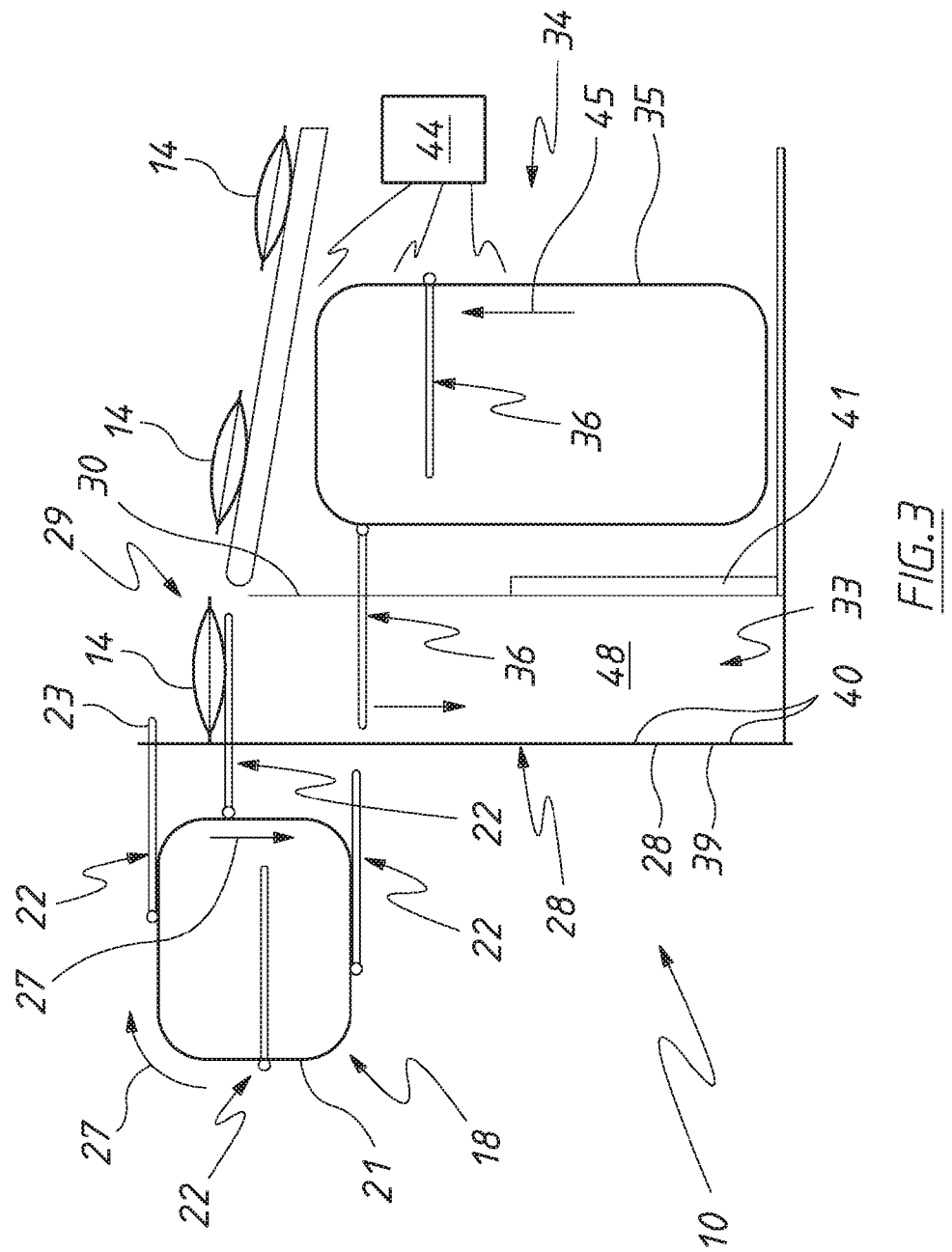
FIGS. 3 to 15 are schematic side elevations of the assembly of FIG. 1, with the assembly at various operational stages.
Figure 4:
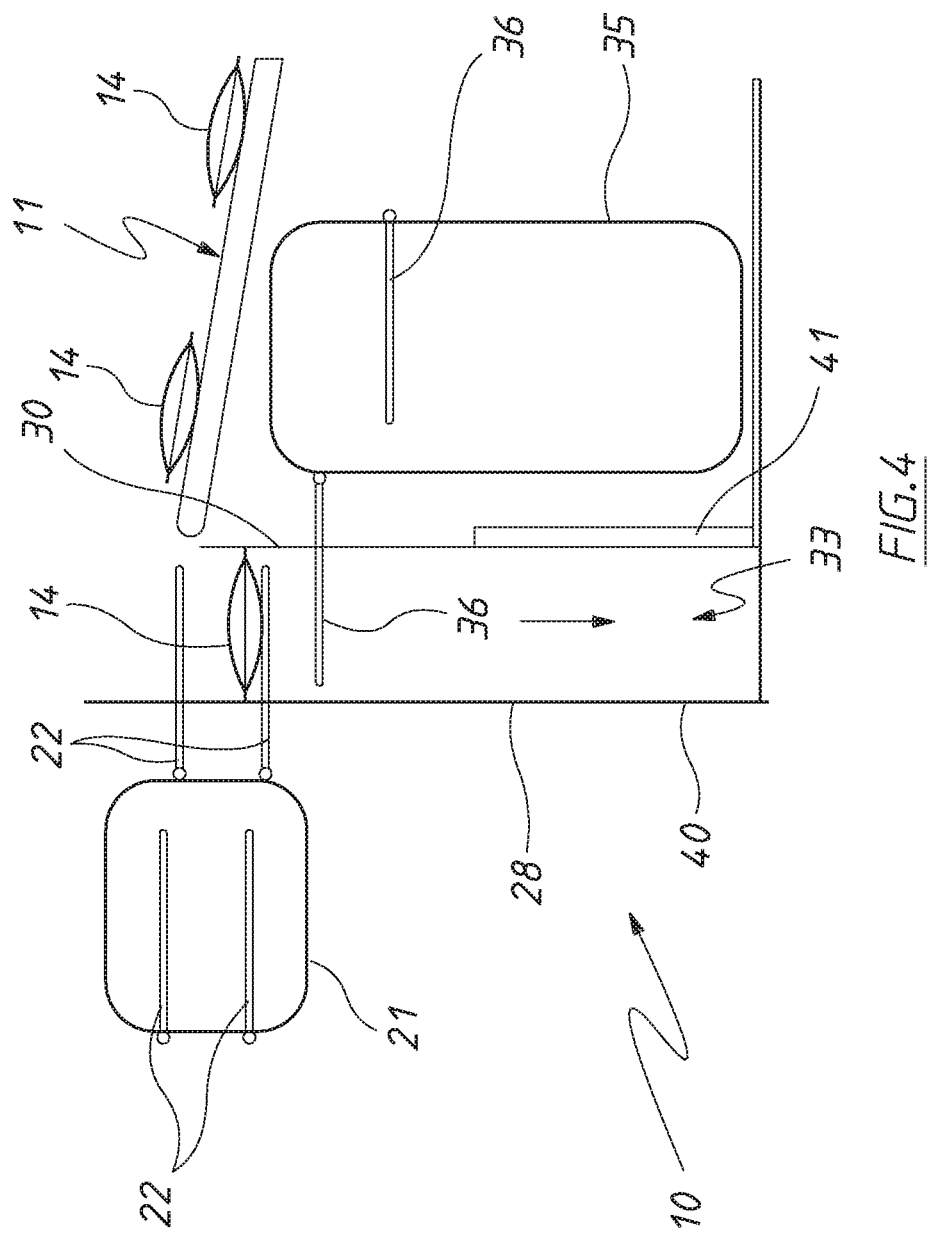
Figure 5:
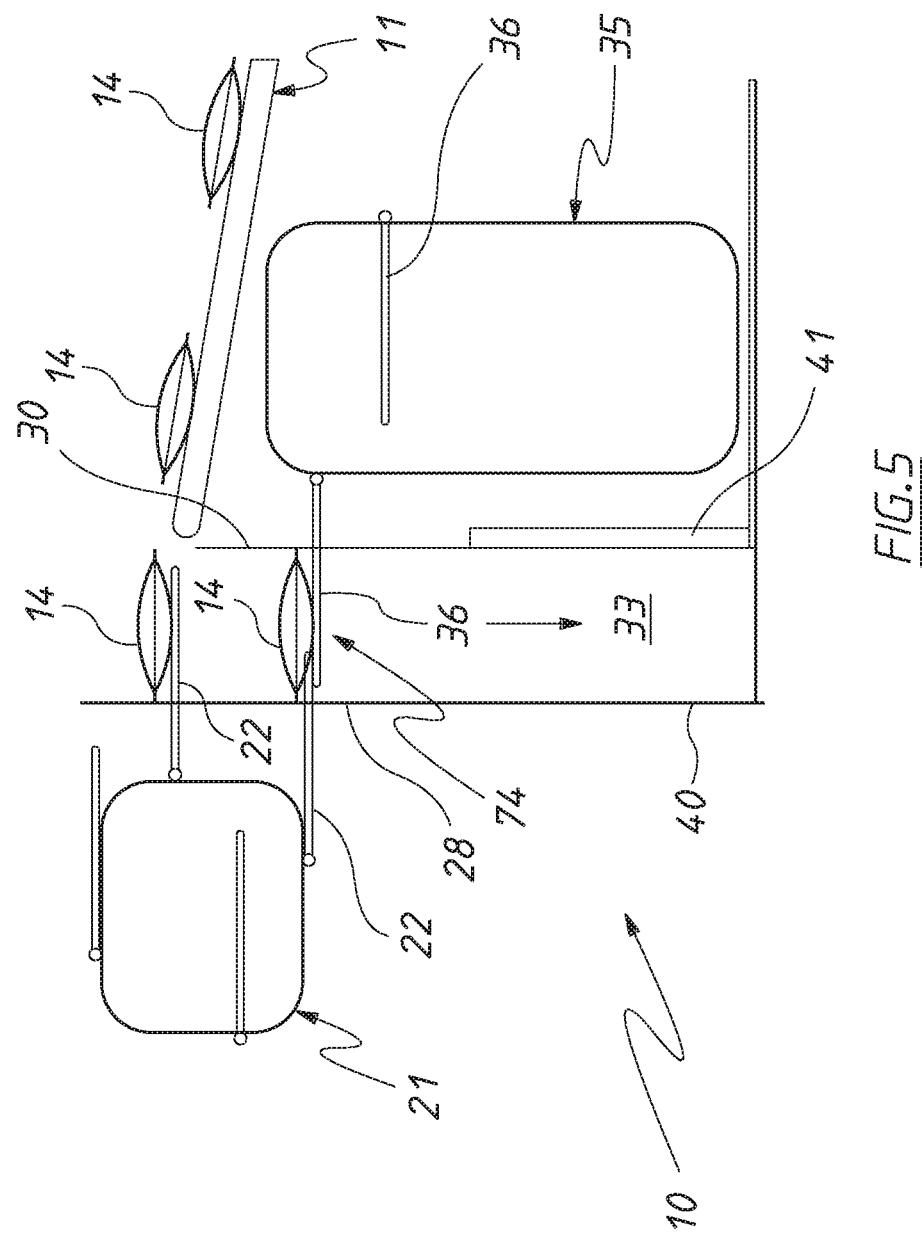
Figure 6:
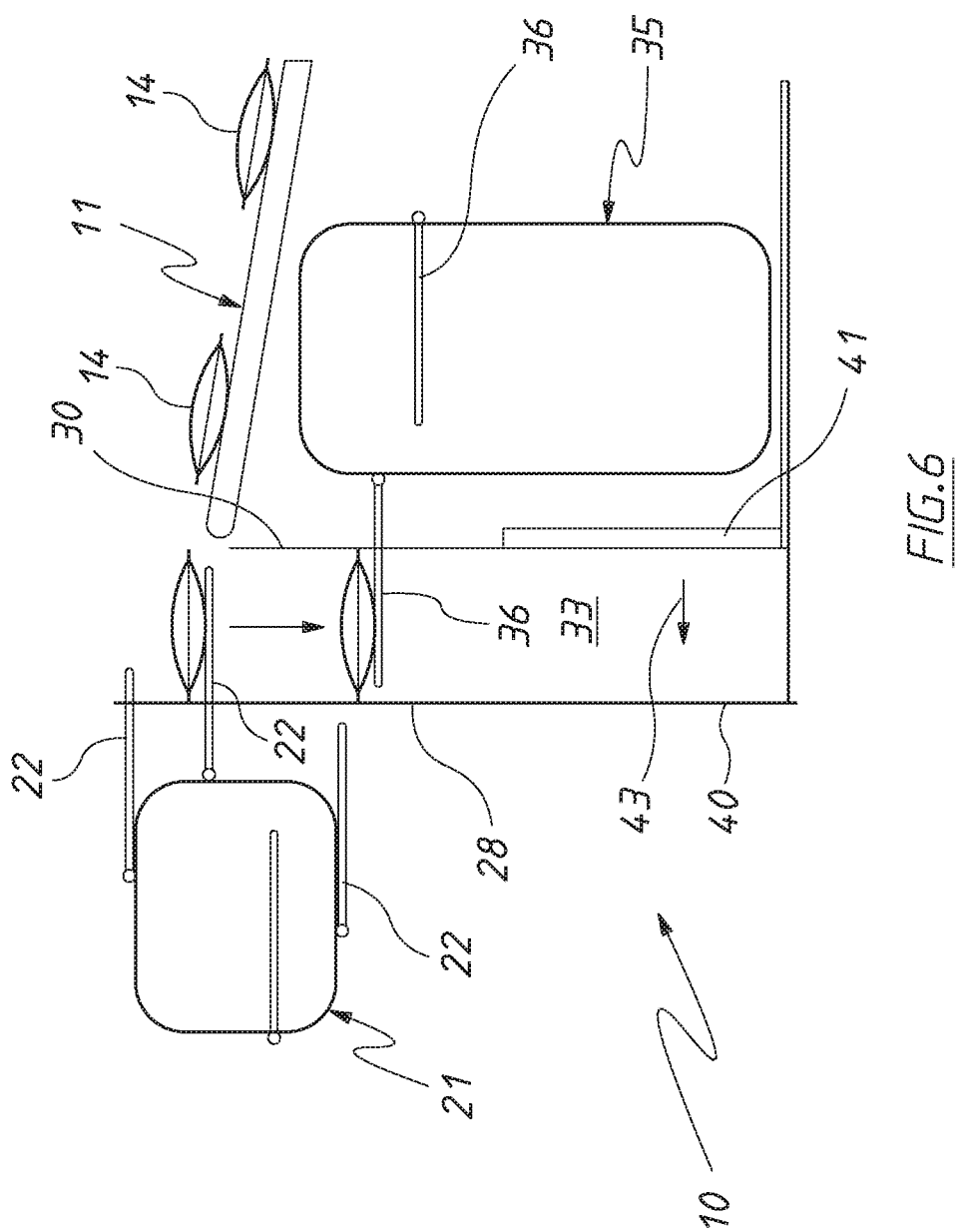
Figure 7:
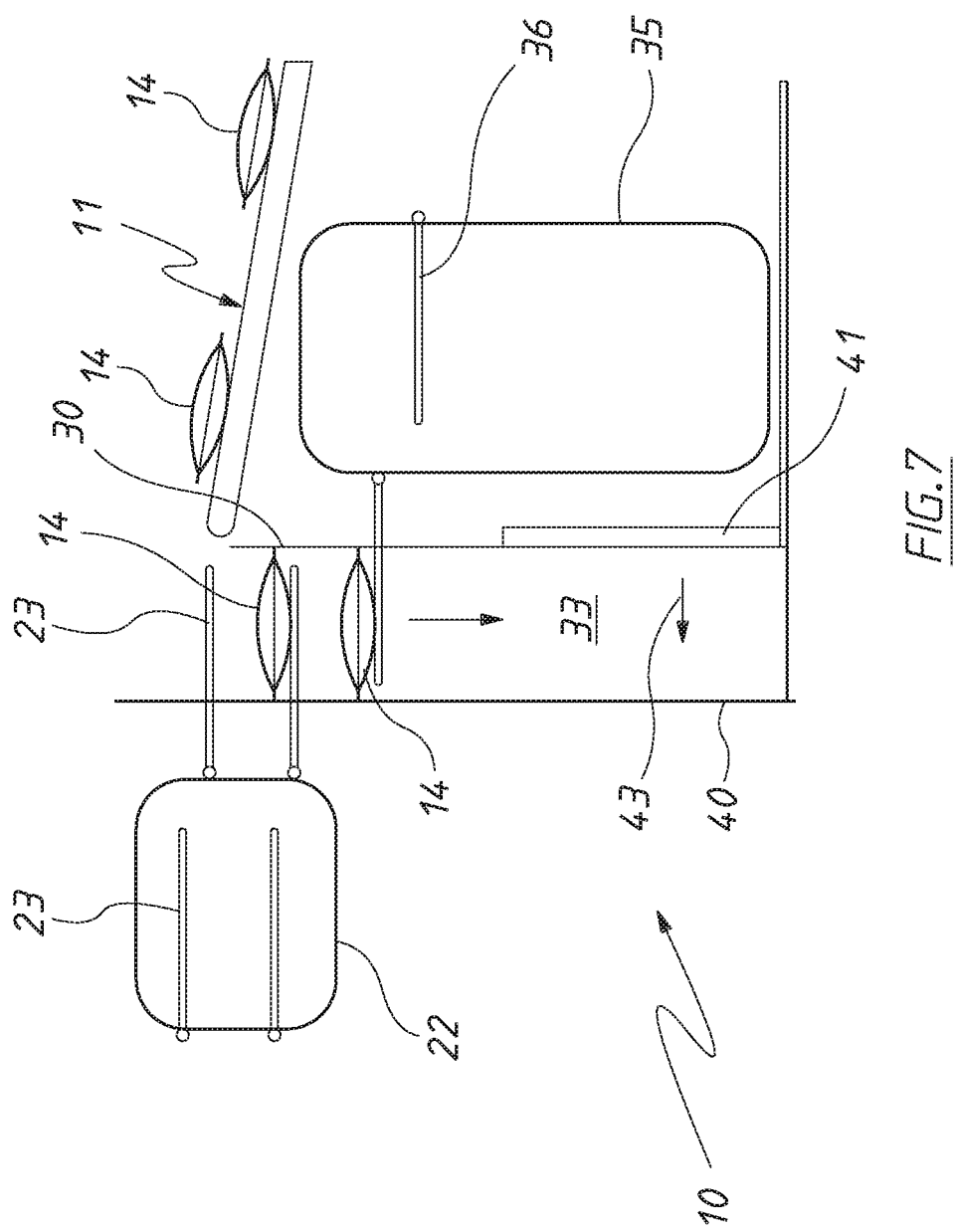
Figure 8:
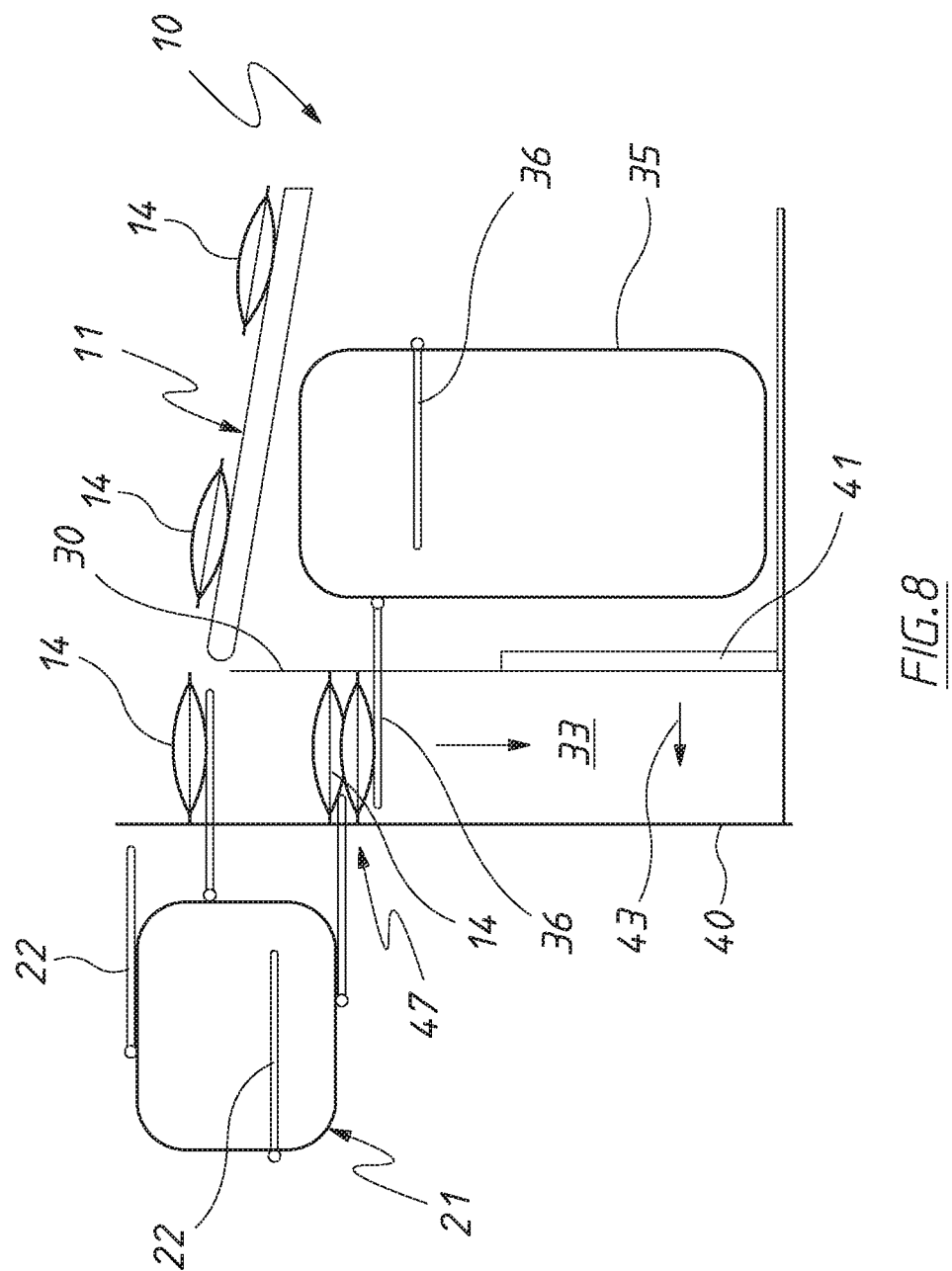
Figure 9:
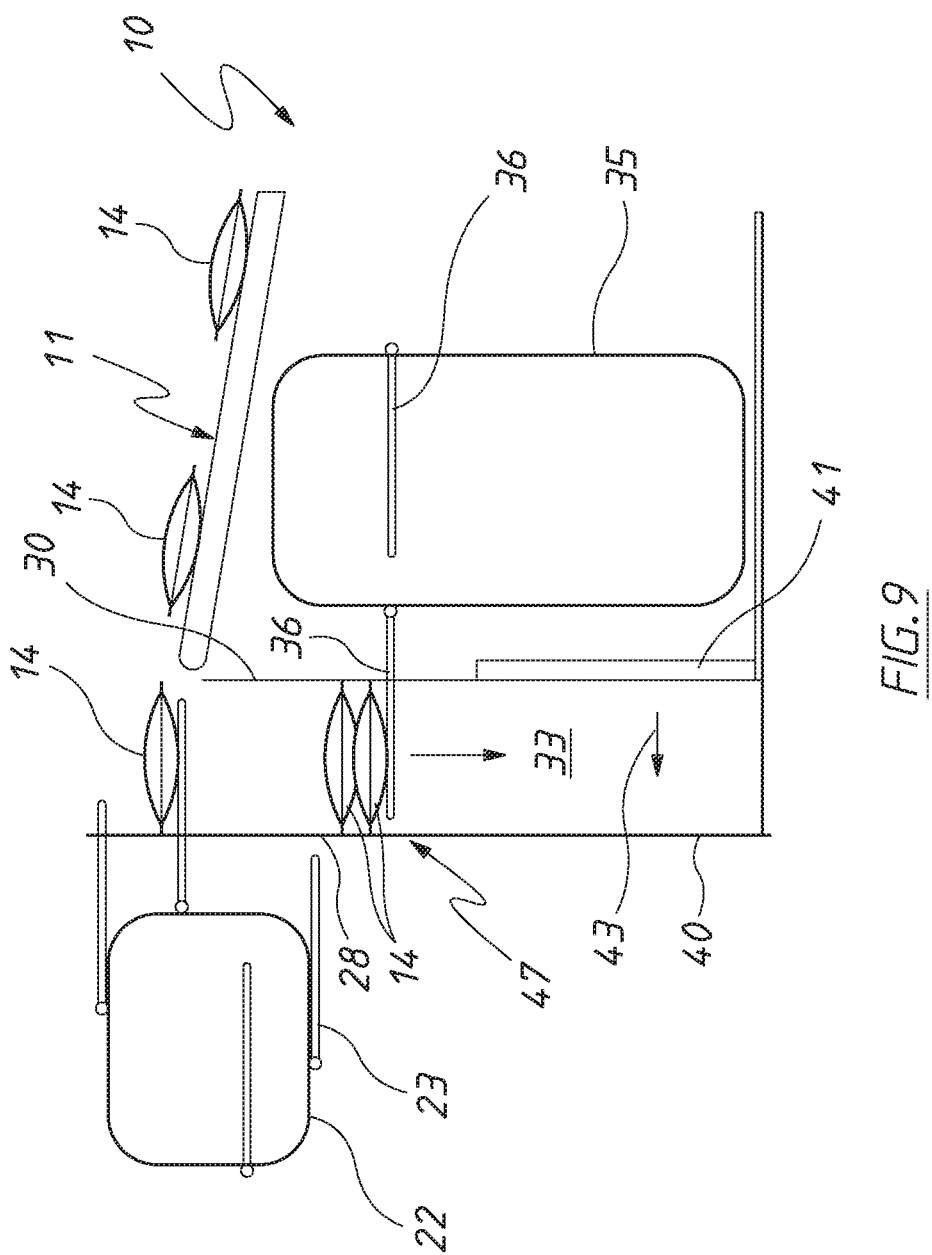
Figure 10:
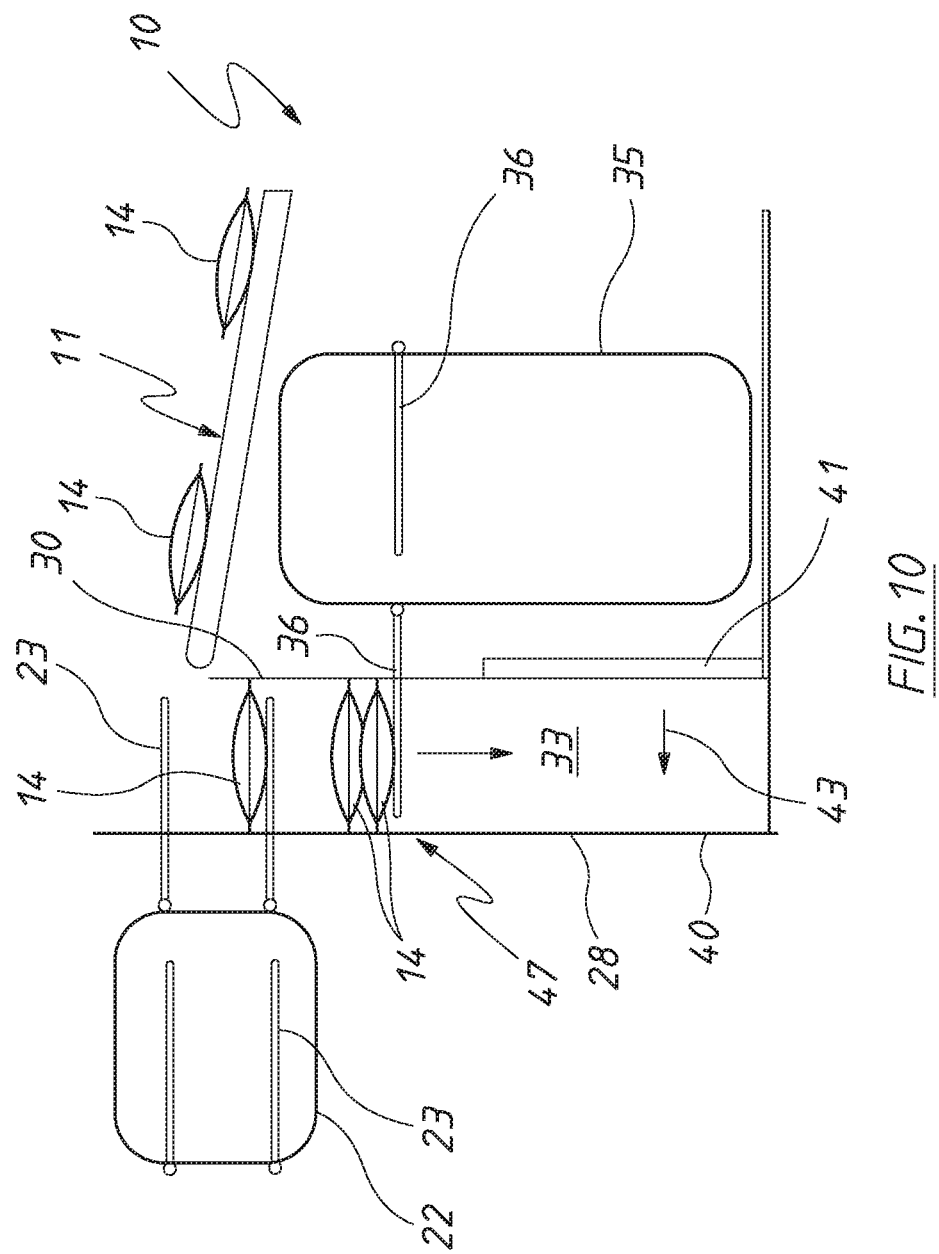
Figure 11:
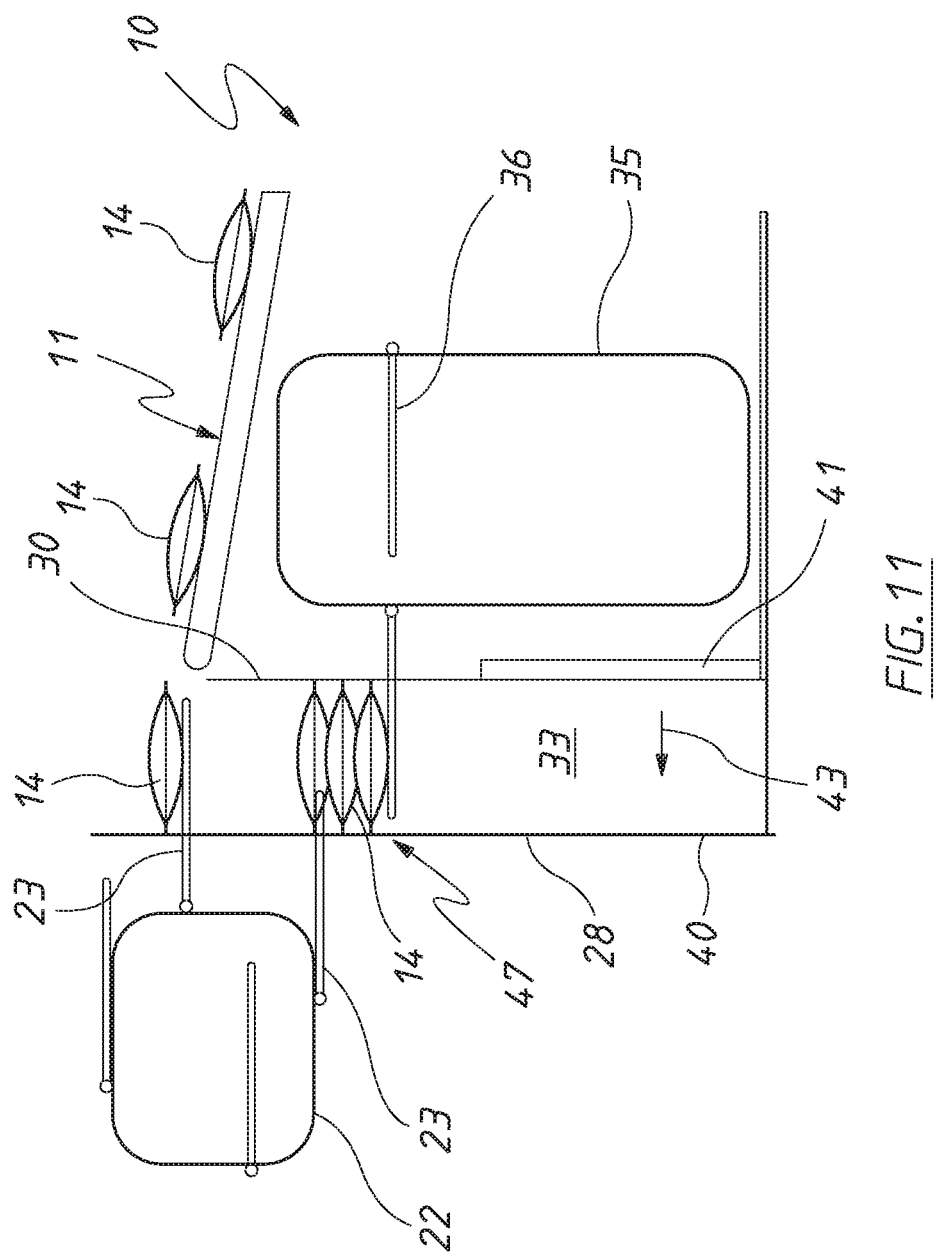
Figure 12:
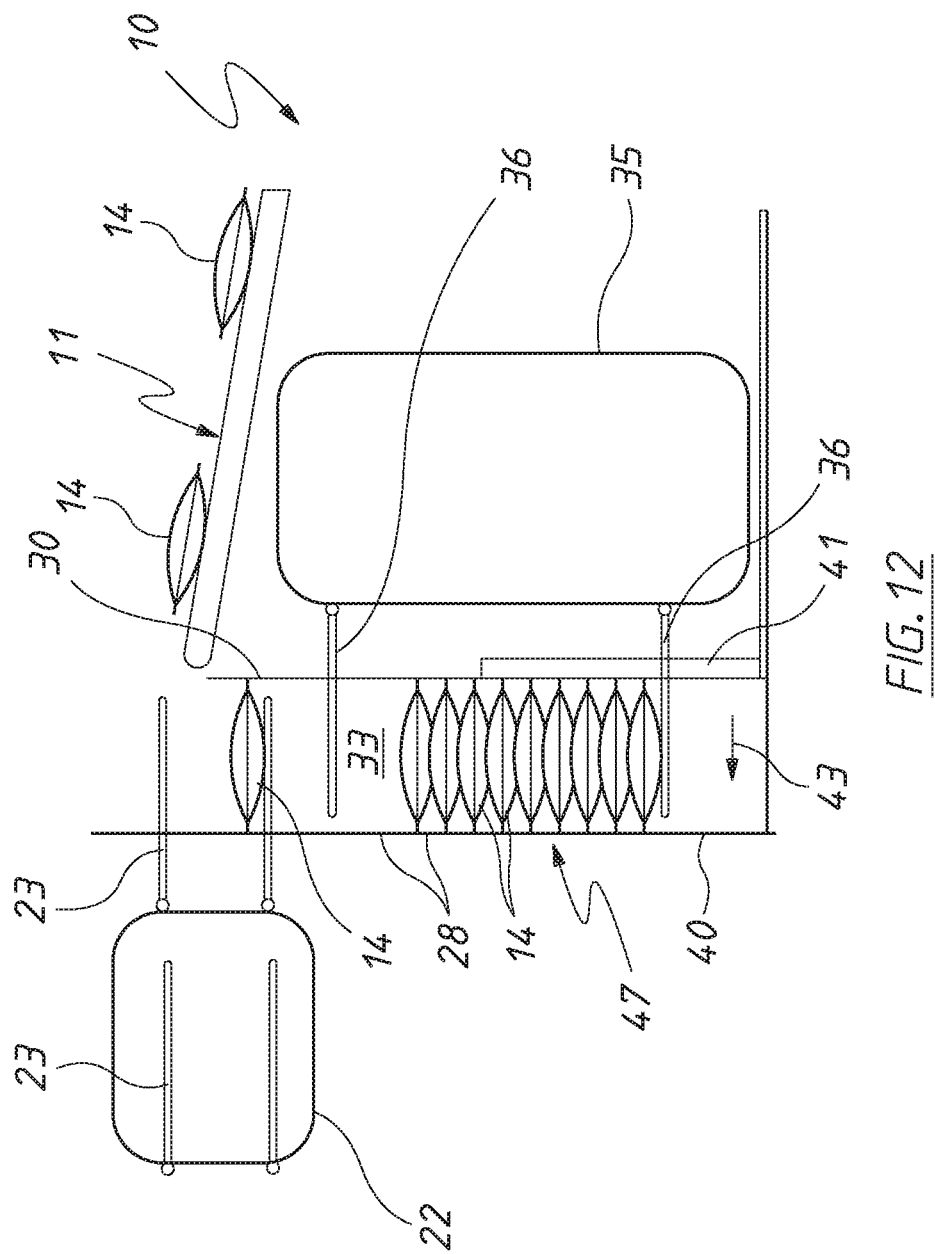
Figure 13:
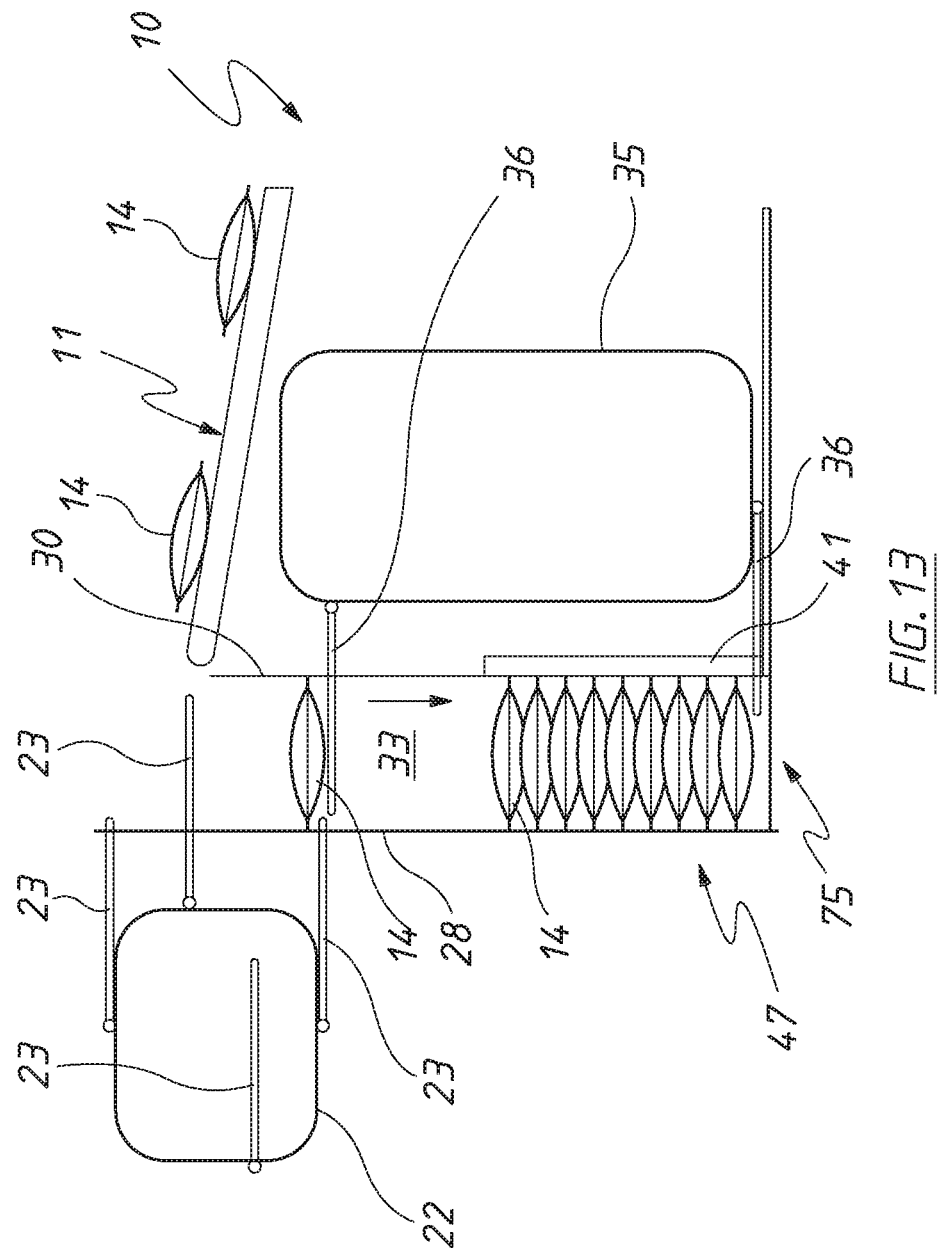
Figure 14:
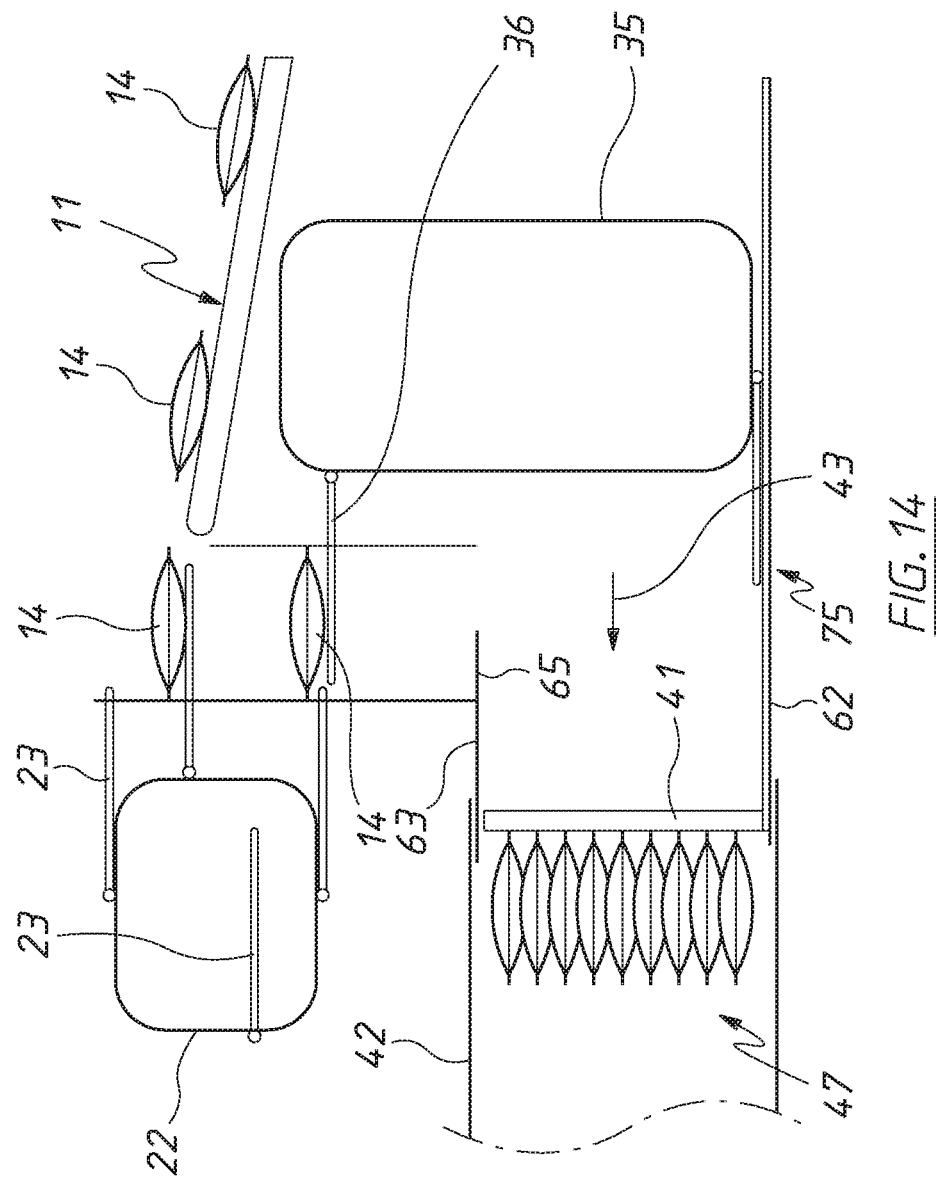
Figure 15:
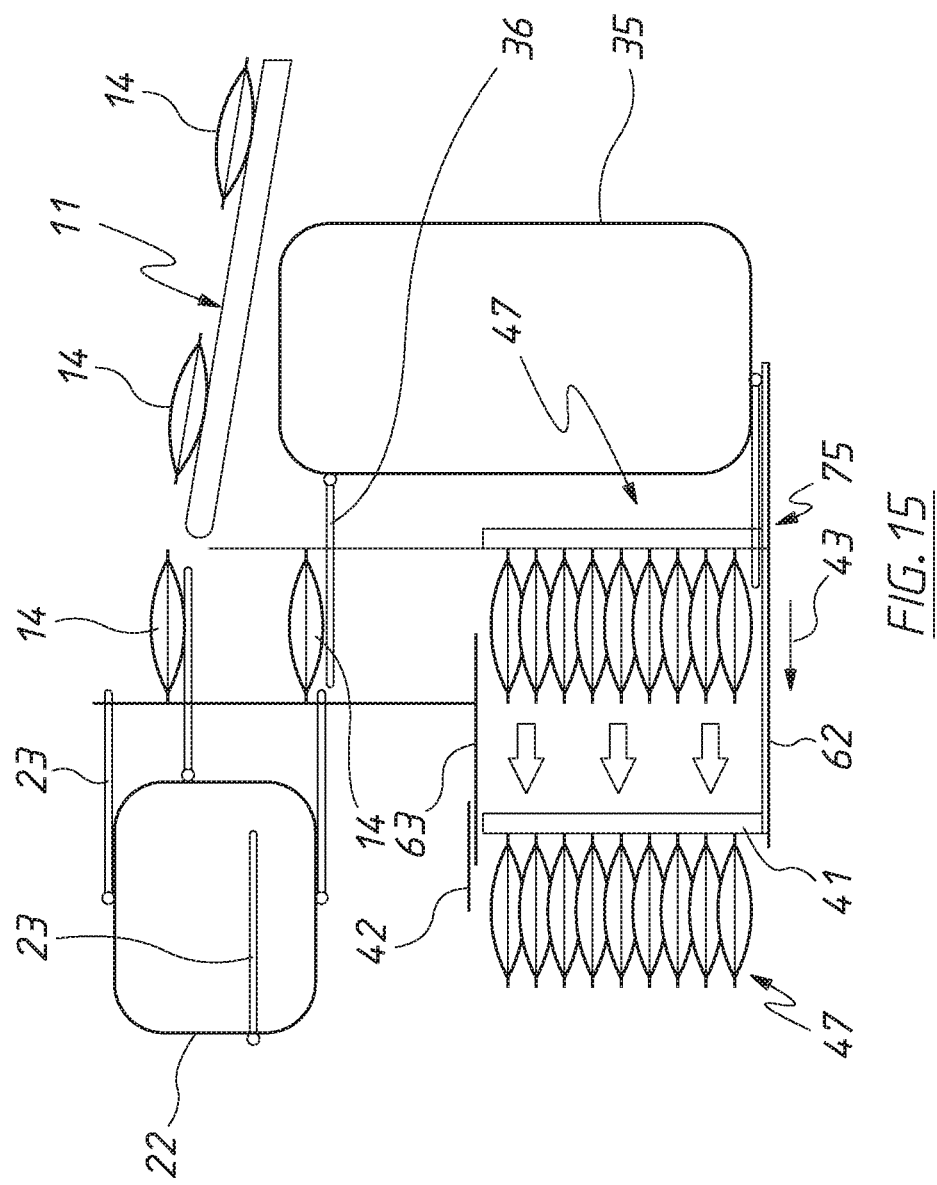
Figure 16:
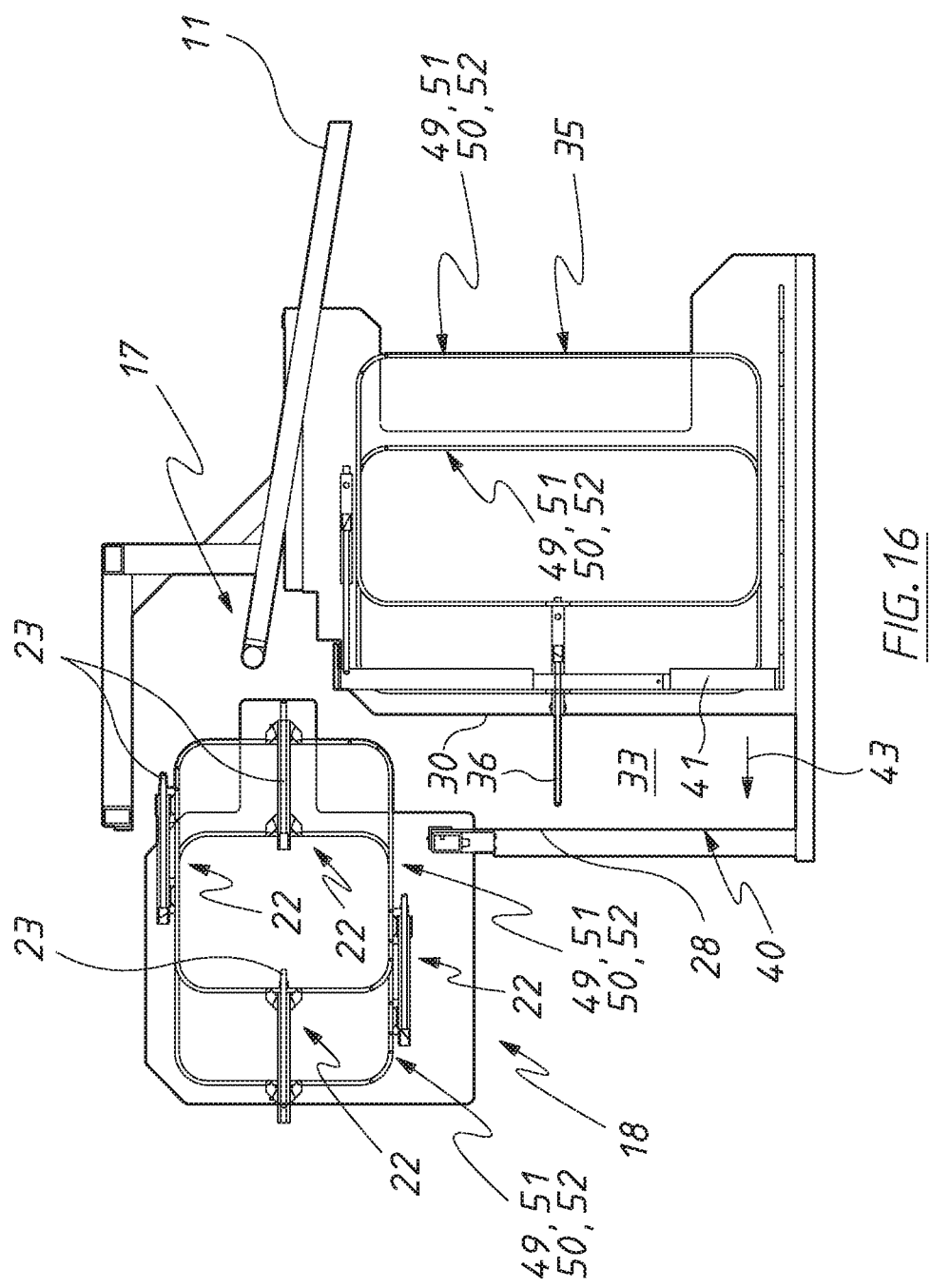
FIG. 16 is a schematic side elevation of the assembly of FIG. 1.
Figure 17:
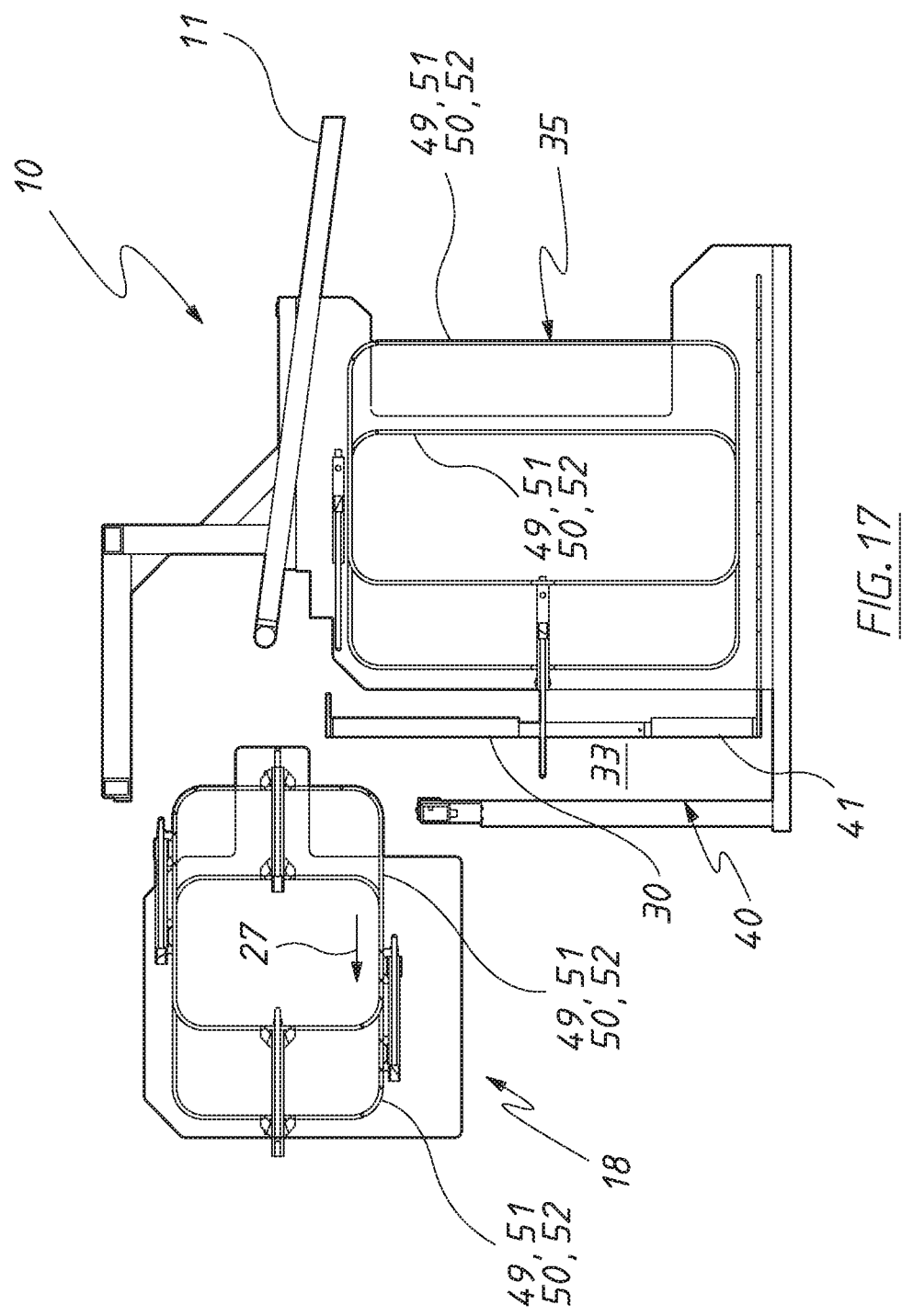
FIG. 17 is a further schematic side elevation of the assembly of FIG. 1.
Figure 18:
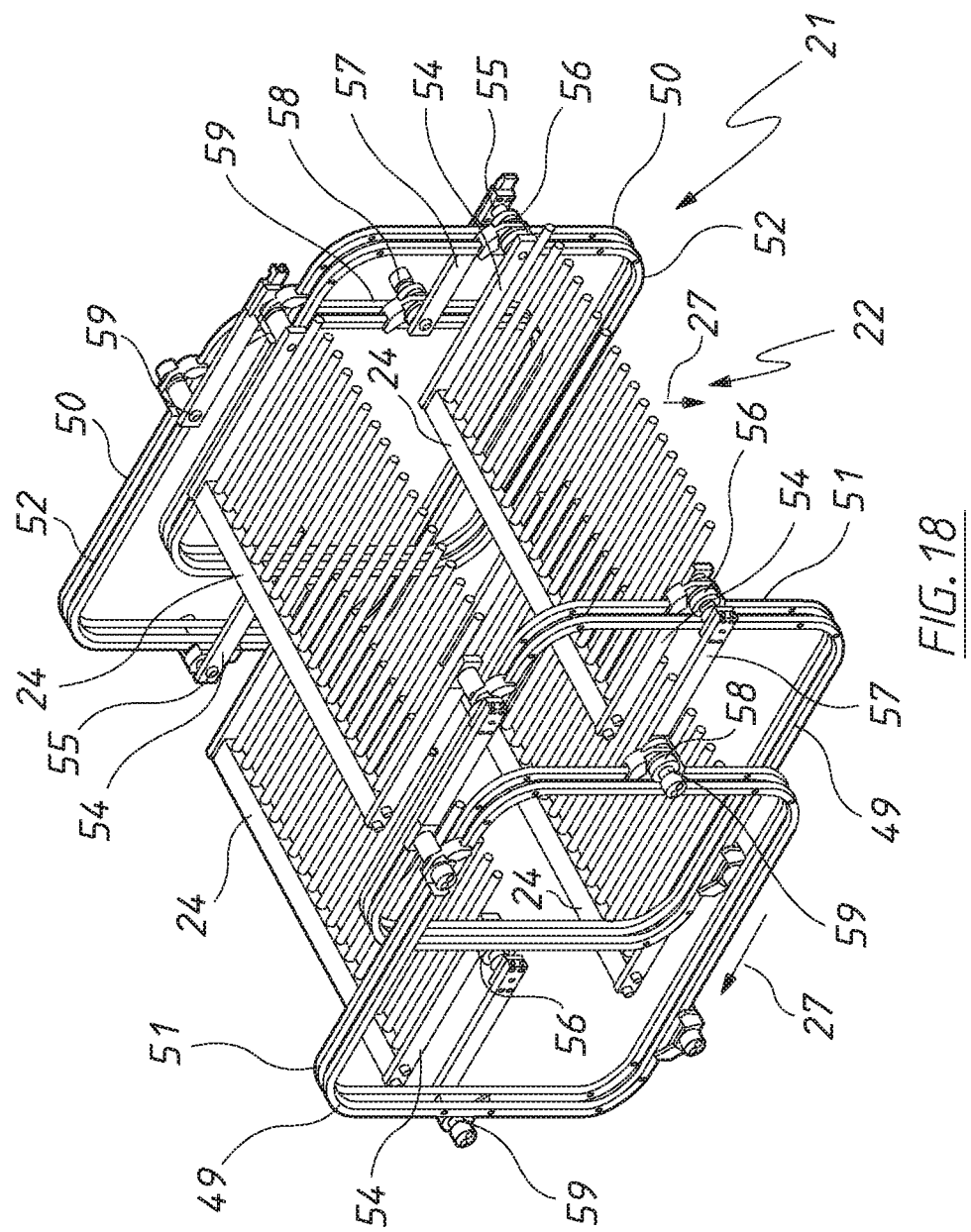
FIG. 18 is a schematic isometric view of the drive assembly employed in assembly of FIG. 1.
Figure 19:
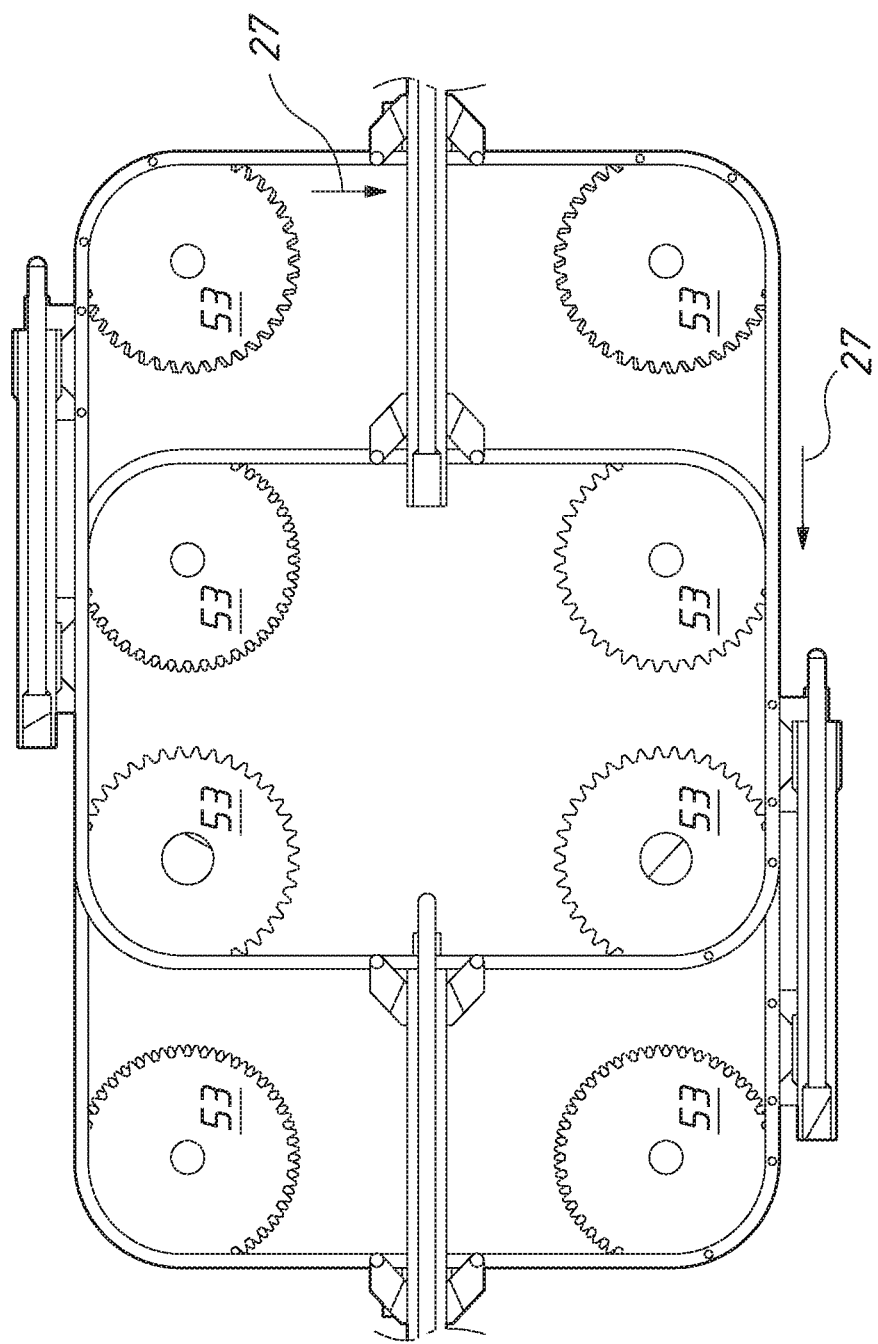
FIG. 19 is a schematic side elevation of the drive assembly of FIG. 18.

In the accompanying drawings there is schematically depicted an assembly 10 to stack bags 14. The assembly 10 includes a bag delivery device 11 that in this embodiment is a belt conveyor 12 having an upper belt length 13 that moves the bags 14 in a delivery direction 15. Typically the end 16 of the belt conveyor 12 would be located adjacent a packaging machine that delivers the bags 14 to the surface 13. As an example, the bags 14 may be bags of snack foods.

The belt conveyor 12 has a delivery end 17 from where the bags 14 are delivered to a first delivery assembly 18 (first support).

The belt conveyor 12 is also movable angularly about a generally upright axis 19, so that the delivery end 17 moves angularly in the direction 20.

The assembly 18 includes a belt or chain drive 21 that supports a plurality of platforms 22. Preferably each of the platforms 22 is maintained in a fixed orientation, as each of the platforms 22 moves about a closed loop provided by the drive 21. Preferably each of the platforms 22 is provided by a plurality of rods or fingers 23, which in this embodiment are generally parallel and co-extensive. The fingers 23 are transversely spaced so as to be separated by slots 46, and are fixed to a transverse beam 24.

The fingers 23 pass through a backing member 28 provided by a plurality of upwardly oriented wires or rods 25 that are separated by upwardly extending slots 26. The rods 23 pass through the slots 26, and the rods 25 pass through the slots 46, when moving about the closed loop provided by the drive 21. The platforms 22 pass in the direction 27 so that adjacent the backing member 28, the platforms 22 are moving in a downward direction through the slots 26 while projecting therethrough. Preferably the downward movement is along a linear path.

When projecting through the slots 26, the rods 23 (platforms 22) are positioned at a receiving position 29 at which the bags 14 are deposited on the platforms 22 in a horizontal row. The bags 14 are placed in a horizontal row as a result of the conveyor 12 oscillating in the angular direction 20 so that the bags 14 are sequentially deposited transversely across each platform 22, as each platform 22 is located at the receiving position 29.

The platforms 22 may be moved continuously in the direction 27, or may be intermittently moved so that the platforms 22 are stationary for at least a portion of time when at the receiving position 29.

Horizontally spaced from the backing member 28 is a further backing member 30. The backing member 30 is provided by a plurality of wires or rods 31 between which there are slots 32. The bags 14 are formed into stacks 47 between the backing members 28 and 30. Accordingly between the backing members 28 and 30 there is an upwardly elongated passage 33 within which the bags 14 are stacked.

The fingers 37 are separated by slots 80 so that the fingers 37 can pass through the slots 32.

Once a horizontal row of the bags 14 is formed on the platform 22 at the position 29, the platform 22 is moved downwardly so as to move the bags 14 down the passage 33.

The bags 14 are stacked in the passage 33 and supported by a second delivery assembly (second support) 34. The assembly 34 is essentially the same construction as the assembly 18 in that it includes a drive 35 having platforms 36 that are moved about a loop provided by the drive 35. The platforms 36 of the drive 35 and the platforms 22 of the drive 18 are moved generally downward through the passage 33. The platforms 36 are preferably maintained in a fixed orientation (horizontal) while passing about the loop provided by the drive 35. The drive 35 includes a chain drive like the chain drive 21.

The platforms 36, like the platforms 22, move along a linear downward path when in the passage 33.

The platforms 36, in this embodiment, are provided by a plurality of rods or fingers 37 that are fixed to a transverse beam 38.

The fingers 37 are transversely spaced so as to be separated by the slots 80. Initially, when the bags 14 are supported on a platform 22, and the horizontal row is complete, the platform 22 is moved downward along the passage 33 so that the fingers 23 are located adjacent the fingers 37 of a platform 36. The first row of bags 14 are transferred to the platform 36 by movement of the fingers 23 out of the passage 33. The next platform 22 receives a horizontal row of bags 14 and is moved down until it is positioned above the first row of bags 14 supported on the platform 36, at which time the platform 22 is moved generally horizontally out of the passage 33 so as to deposit the bags 14 supported thereon onto the row of bags 14 below. This process is repeated. Accordingly a stack 47 of bags 14 is formed on the platform 36 by moving the platform 36 downward as the stack 47 is being formed. More particularly each platform 36 is lowered so as to accommodate the next row of bags 14, that form the stack 47, to be delivered from the respective platform 22.

Once a completed stack 47 is formed it is moved downward to a second delivery position 75. In an alternative embodiment, the movement of the completed stack 47 could be horizontal.

The stack 47 may have one or more rows of bags 14.

The backing member 28 (located at the location 76) has an opening 39 that is selectively closed by a pair of doors 40. When the stack 47 has the required number of bags 14, the doors 40 are open and a transfer member 41 operated to move the stack 47 generally horizontal in the direction 43 to locate the stack 47 in a box 42 at least partly located adjacent the opening 39.

The above process is repeated until the box 42 is full of bags 14.

A central controller (device) 44 is programmed to coordinate operation of the conveyor 12, the assembly 18, the assembly 35, and movement of the transfer member 41.

As is illustrated in FIGS. 3 to 15, the assemblies 18 and 34 move the platforms 22 and 36 along a generally linear path down the passage 33 to form the stacks 47 bags 14.

The backing member 28 and/or the backing member 30 (together with the member 41) may be movable horizontally relative to each other to change the horizontal width of the passage 33 to accommodate bags 14 of different sizes. Further, side plates 48 may be on either side of the passage 33 to adjust the transverse width of the passage 33 to accommodate a required number of bags 14 in a horizontal row. For example, each row may consist of one or more bags 14, such as two, three, four or five bags 14. The angular movement of the conveyor 11 would need to be adjusted.

In FIGS. 17 to 23 there is provided one embodiment of the assembly 10. In this embodiment the drive 21 includes four pairs of chains 49, 50, 51 and 52.

The first pair of chains 49 co-operate with the second pair of chains 50 in supporting and moving a first set of the platforms 22. The third pair of chains 51 co-operates with the fourth pair of chains 52 to also support and move a second set of the platforms 22. This enables the platforms 22 (of the first set), driven by the chains 49 and 50 to be operated at different times at different speeds to the platforms 22 (of the second set) supported by the chains 51 and 52. For example, as the bags 14 are being delivered to a platform 22, the respective platform 22 may be stationary or moving very slowly. Meanwhile platforms 22 driven by the other pair of chains can be moved at a greater speed so as to be returned to adjacent the position 29.

In this embodiment, there are four platforms 22. Each of the platforms 22 is supported by a pair of arm 54 between which the beam 24 extend so as the fixed thereto. Each of the arms 54 has an end supported by a shaft 55 supporting a bearing assembly 56. Each arm 54 is fixed to its respective shaft 55 so that they angularly move in unison.

Each bearing assembly 56 is supported by a respective chain 49 or 51.

Extending from each shaft 55 is a further arm 57, with each arm 57 extending to a further bearing assembly 58, with a further shaft 59 being fixed to a respective one of the arms 57 and supported by a respective bearing assembly 58. Each bearing assembly 58 is supported by a respective one of the chains 50 or 52.

The above arrangement ensures that fingers 23 (platform 22) are maintained in a generally horizontally bending orientation when passing down the passage 33. In this embodiment the platforms 22 are maintained generally horizontal during their entire movement.

The drive 35 is essentially the same construction as the drive 21, except that the drive 35 is vertically elongated, and the chains move in an opposite angular direction to the direction 27 of the drive 21.

The doors 40 include an upper door 61 and a lower door 62. The upper door 61 is pivotably mounted for angular movement about a generally horizontal axis 63, while the lower door 62 is pivotably mounted for angular movement about an axis 64. The axis 63 and 64 are generally parallel and horizontally extending.

Figure 20:
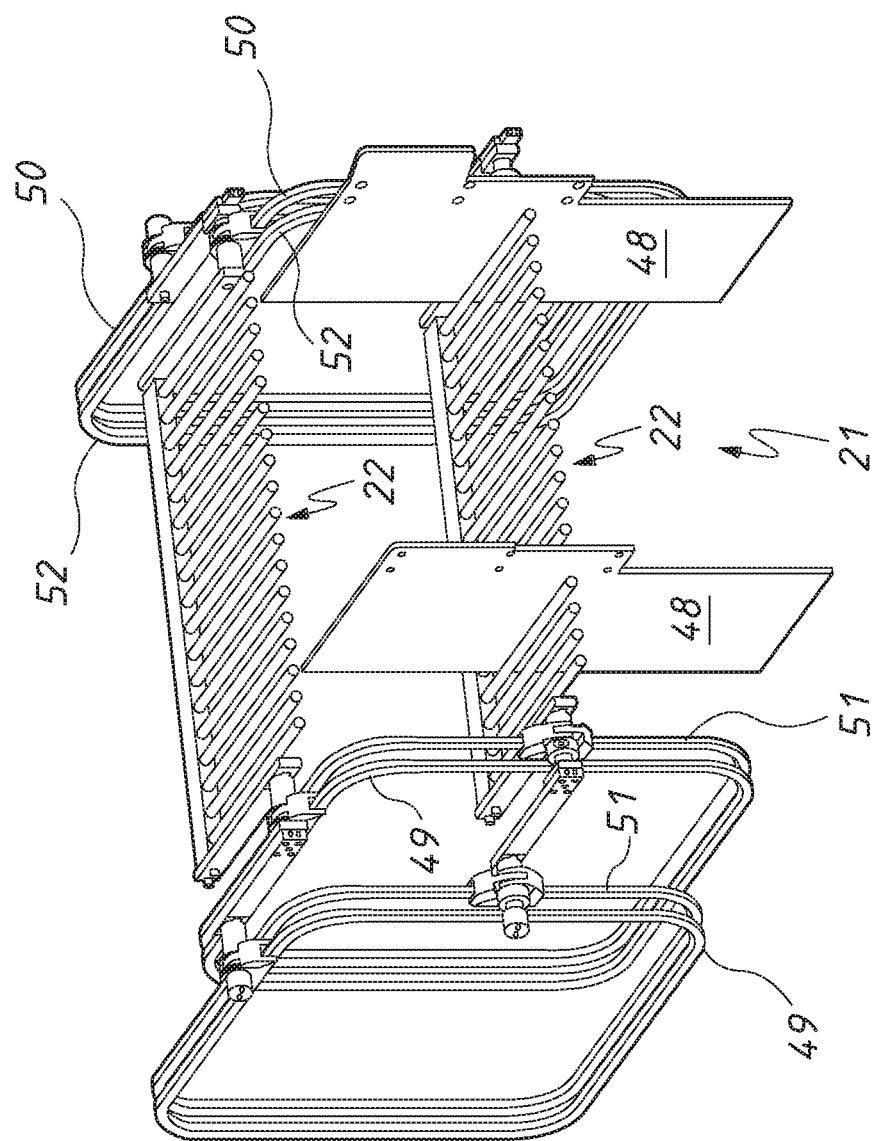
FIG. 20 is a schematic isometric view of the drive assembly of FIG. 19.
Figure 21:
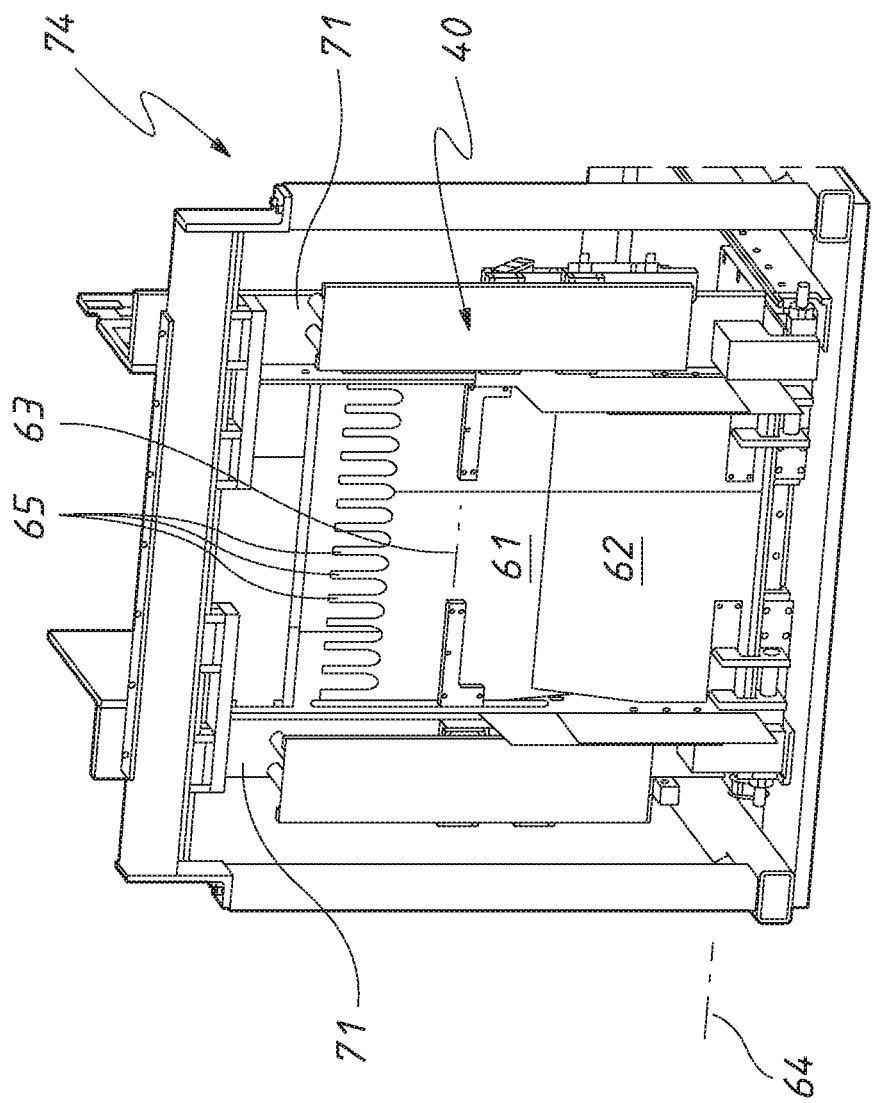
FIG. 21 is a schematic isometric view of a lower portion of the assembly of FIG. 1.
Figure 22:
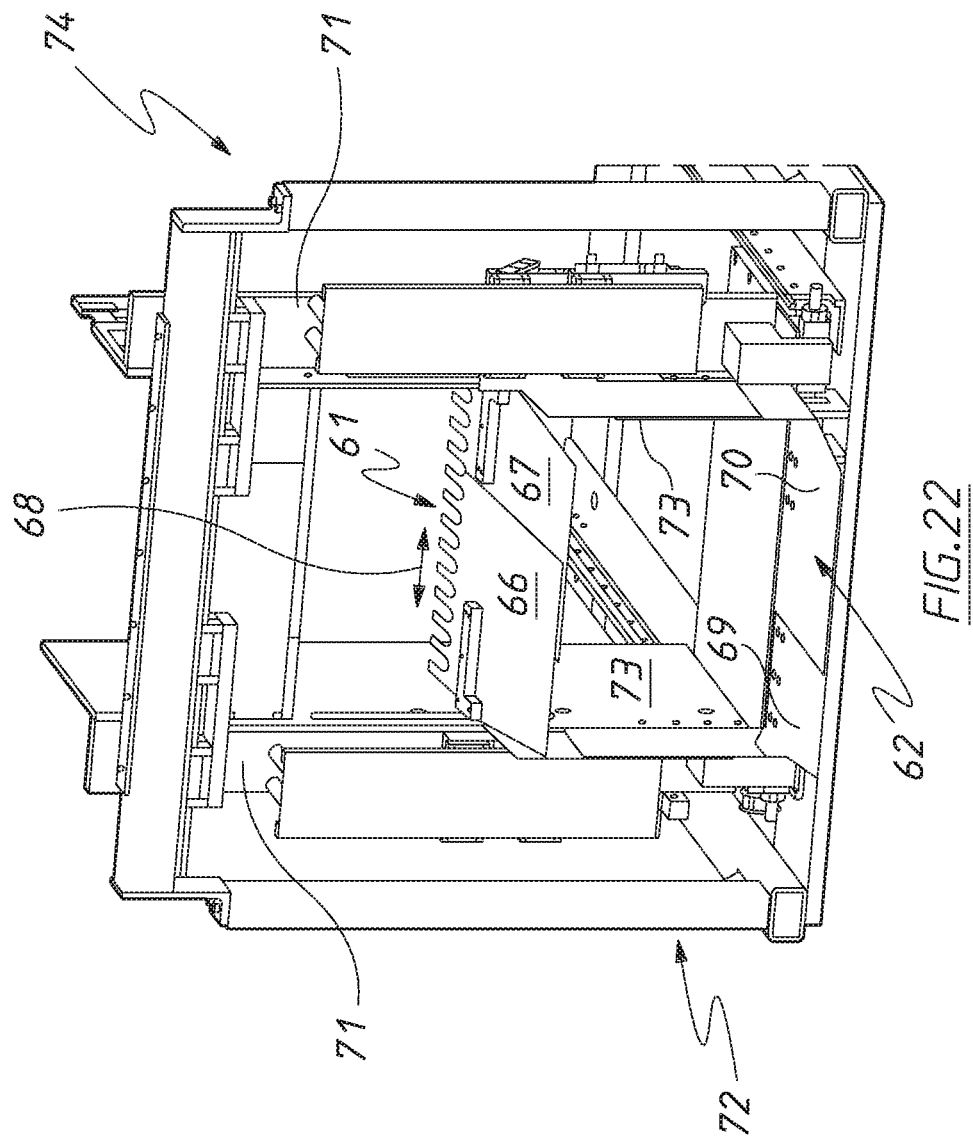
FIG. 22 is a further schematic isometric view of the lower portion as illustrated in FIG. 21.
Figure 23:
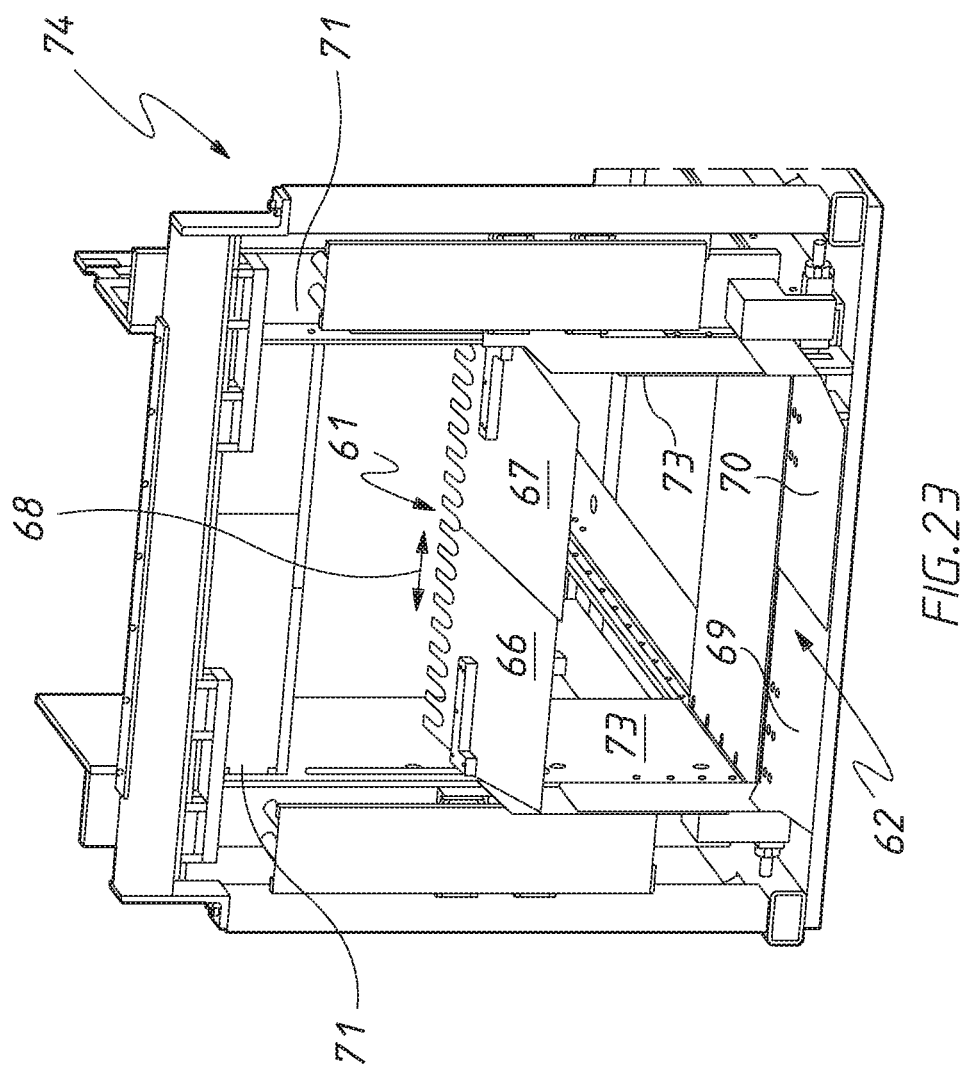
FIG. 23 is a still further isometric view of the lower portion of FIG. 21.

The upper door 61 has a plurality of fingers 65 that are shaped and positioned to pass between the rods 31. When the door 61 pivots about the generally horizontal axis 23 from the generally upward position as shown in FIG. 20, to a generally horizontal position as shown in FIG. 21, being fingers 25 engage the bags 14 at the upper level of the stack 47, to ensure that the bags 14 are located at a height that they can be transferred to the box 42. This may entail some compression of the bags 14.

In the above described preferred embodiments, the fingers 23 and 37 are generally horizontally extending when passing downwardly through the passage 33. However, it should be appreciated that the fingers 23 and 37 may be inclined, they merely need to be oriented so that the bags 14 can rest thereon.

In the above described preferred embodiments, the platform 22 and 36 pass downwardly along the passage 33. Their movement may not be linear, it may be curve. All that is required is that the platforms 22 and 36 move downwardly through the passage 33.

In the above describe preferred embodiment, the bags 14 (as shown in FIG. 1) are deposited on the platform 22 so as to form a horizontal row. In this respect, it should be appreciated that more than one horizontal row may be supported on each platform 22.

As best seen in FIGS. 20 to 23 the door 61 is formed of two door panels 66 and 67 that are movable relative to each other in the transverse direction 68 to accommodate the stacks 47 being of different widths and boxes 42 having different widths.

Similarly, the door 62 is formed of two door panels 69 and 70. The door 69 and 70 are also movable relative to each other in the direction 68, with the door panels 66 and 67.

The panels 66, 67, 69 and 70, are mounted on support beams 71, with the beams 71 being movably mounted on a frame 74 to provide for movement of the panels 66, 67, 69 and 70 in the direction 68.

Also supported on the beams 71 are side panels 73, with the doors 61 or 62, and side panels 73 co-operating to provide a generally rectangular aperture through which each stack 47 may pass.

Additionally, the door 61 is mounted on the beam 71 for vertical movement to adjust the height of the aperture closed by the doors 61 and 62.

In operation of the above described assembly 10, the bags 14 are delivered to the receiving position 29 and are arranged in a horizontal row. From there, each row is lowered to a first delivery position 74 that also corresponds to and is adjacent the second receiving position. At the position 74 the bags 14 are transferred to the platforms 36 by the movement of the platforms 22 generally horizontally away from the passage 33. The platforms 22 return to the position 29. The platforms 36 are subsequently lowered to accommodate further rows of bags 14 until a stack 47 is formed. Each stack 47 once formed is delivered to the bottom of the passage 33 by the platforms 36. This is a second delivery position 75. At this position, each stack 47 is horizontally transferred to a box 42. However, at the second delivery position 75, the platforms 36 are moved horizontally away from the passage 33 and again are transferred back up to the position 74. In an alternative embodiment the stacks 47, once formed and being supported on the platforms 36, are moved horizontally to a horizontally displaced second delivery position 75.

The invention claimed is:

1. A bag stacking assembly to stack bags, the bag stacking assembly including:
   a first delivery assembly to receive a plurality of the bags at a first receiving position and sequentially move the bags downward along a passage to a first delivery position; and
   a second delivery assembly to receive only the bags from the first delivery assembly, at a second receiving position that is adjacent the first delivery position, so that stacks of the bags are sequentially formed in the passage and supported by the second delivery assembly, with the second delivery assembly moving each stack downward, to a second delivery position, as each stack is being formed; and
   a control device coordinating operation of the first and the second delivery assemblies in a manner so that the stacks are formed;
   a backing member adjacent the passage and having a plurality of upwardly extending slots; and
   wherein the first delivery assembly includes at least one first platform to which the bags are delivered at the first delivery position, the first platform being moved down the passage to the first delivery position, and the second delivery assembly includes at least one second platform, the second platform being movable down the passage from the second receiving position to accommodate transfer of the bags from the first platform to be supported on the second platform to provide for stacking of the bags being supported by the second platform, with the first platform being a plurality of fingers that pass down the slots.

2. The bag stacking assembly of claim 1, wherein the first delivery assembly includes at least one further platform, and the first delivery assembly includes a drive, the drive being operable to move the first platform at a different speed to the further platform.

3. The bag stacking assembly of claim 1, wherein the second platform includes a plurality of fingers, with adjacent fingers of each platform being separated by a slot, with the fingers of both platforms extending generally transverse relative to said passage when located therein, and being generally parallel.

4. The bag stacking assembly of claim 3, wherein the drive moves the second platform about a closed loop.

5. The bag stacking assembly of claim 1, further including at least one backing member extending downwardly adjacent to said passage to aid in retaining the bags on the platforms.

6. The bag stacking assembly of claim 5, includes two backing members, the backing members being spaced so as to be on opposite sides of the passage, the backing members cooperating to retain the bags on the platform.

7. The bag stacking assembly of claim 1, wherein both platforms are generally horizontally oriented when passing along said passage, and the platforms when moving along said passage along a generally linear path.

8. The bag stacking assembly of claim 1, further including a stack transfer member, the stack transfer member being located adjacent the second platform delivery position, and movable to transfer the stacks from the passage.

9. The bag stacking assembly of claim 8, wherein the assembly includes at least one door closing a portion of said passage, the door being movable to an open position to provide for transfer of the stacks from within the passage.

10. The bag stacking assembly of claim 9, wherein said door pivots about a generally horizontal axis, and includes a portion that projects into the passage when providing for the delivery of the stacks, the portion being positionable to engage the stacks to ensure that the stacks have a desired height.

11. The bag stacking assembly of claim 1, further including a conveyor to deliver the bags to the first platform receiving position, the conveyor being angularly movable to provide for the delivery of bags to each first platform so the bags can be arranged in a generally horizontal row, and said control device coordinate operation of the conveyor with the delivery assemblies.

12. The bag stacking assembly of claim 1, wherein the delivery assemblies are located on opposite side of the passage.

13. The bah stacking assembly of claim 1, wherein each platform is maintained in a fixed orientation.

14. A method of stacking bags, the method including:
   delivering a plurality of the bags to a first receiving position at which the bags are supported by a first support, and arranging the bags in a horizontal first row on the first support;
   lowering the row to a first delivery position at which row is delivered to a second support at a second receiving position;
   lowering the second support from the second receiving position,
   delivering at least one further row of the bags to the first support at the first receiving position so to as to be supported by the first support;
   lowering each further row to the first delivery position; and
   transferring each further row so as to be supported on the first row so as to form a stack.

15. The method of claim 14, wherein each stack is transferred in a predetermined direction to the second delivery position.

16. The method of claim 14, wherein the predetermined direction is downward.

17. The bag stacking assembly of claim 1, further including a drive that moves the first platform around a closed loop.

* * * * *